United States Patent
Suemura

(10) Patent No.: US 7,411,964 B2
(45) Date of Patent: Aug. 12, 2008

(54) COMMUNICATION NETWORK, PATH SETTING METHOD AND RECORDING MEDIUM HAVING PATH SETTING PROGRAM RECORDED THEREON

(75) Inventor: Yoshihiko Suemura, Tokyo (JP)

(73) Assignee: NEC Corporation (JP)

( * ) Notice: Subject to any disclaimer, the term of this patent is extended or adjusted under 35 U.S.C. 154(b) by 1250 days.

(21) Appl. No.: 10/093,516

(22) Filed: Mar. 11, 2002

(65) Prior Publication Data

US 2002/0131424 A1   Sep. 19, 2002

(30) Foreign Application Priority Data

Mar. 14, 2001   (JP)  ............................. 2001-071365

(51) Int. Cl.
  *H04L 12/28* (2006.01)
  *H04L 12/56* (2006.01)
  *G06F 15/173* (2006.01)

(52) U.S. Cl. ...................................... 370/400; 709/239

(58) Field of Classification Search ................. 370/400, 370/328, 255, 225, 248, 228, 254, 700, 431, 370/395, 238, 351, 230, 401, 408, 389, 216, 370/335, 342, 441; 709/238, 223, 239, 241; 455/507, 450, 518; 398/1, 27; 714/43
See application file for complete search history.

(56) References Cited

U.S. PATENT DOCUMENTS 7,039,009 B2 * 5/2006 Chaudhuri et al. .......... 370/225

2001/0032271 A1 * 10/2001 Allen .......................... 709/239
2002/0116669 A1 * 8/2002 Jain ............................ 714/43
2003/0026268 A1 * 2/2003 Navas ......................... 370/400

FOREIGN PATENT DOCUMENTS

| JP | 9-224026 | 8/1997 |
|---|---|---|
| JP | 2770749 | 4/1998 |
| JP | 11-508421 | 7/1999 |
| JP | 11-261512 | 9/1999 |
| JP | 2001-24651 | 1/2001 |

OTHER PUBLICATIONS

Japanese Office Action issued Dec. 7, 2004 (w/ English translation of relevant portions).

(Continued)

*Primary Examiner*—Wing F. Chan
*Assistant Examiner*—Prenell P Jones
(74) *Attorney, Agent, or Firm*—Dickstein, Shapiro, LLP.

(57) ABSTRACT

To prevent load of route calculation from being centralized in part of units. A node calculates routes of a primary path and an alternate path and sends them to a management center. The management center checks whether SRLGs of the two routes overlap, and instructs the node to perform calculation again if the routes overlap. The management center searches for an alternate path having a route overlapping the route of the above described alternate path. When an overlapping alternate path exists, and SRLGs of a primary path corresponding to the alternate path and the above described primary path do not overlap, a link is shared in an overlapping portion of the routes of the two alternate paths.

6 Claims, 32 Drawing Sheets

OTHER PUBLICATIONS

T. Wu, "Fiber Network Service Survivability"; pp. 76-83.

K. Kompella, et al. "OSPF Extensions in Support of MPL(ambda)S"; pp. 1-12.

Bruce Davie, et al., "MPLS Technology and Applications"; pp. 175-180 (2000).

D. Saha, et al., "RSVP Extensions for Signaling Optical Paths".

J.W. Suurballe, "Disjoint Paths in a Network", pp. 125-145 (1974).

* cited by examiner

FIG. 4

| NODE | ADJACENT NODE | LINK GROUP | METRIC | NUMBER OF AVAILABLE LINKS |
|---|---|---|---|---|
| 1 | 2 | (1,2) | 1 | 4 |
| 1 | 3 | (1,3) | 1 | 4 |
| 1 | 4 | (1,4) | 1 | 4 |
| 2 | 1 | (1,2) | 1 | 4 |
| 2 | 6 | (2,6) | 1 | 4 |
| 3 | 1 | (1,3) | 1 | 4 |
| 3 | 5 | (3,5) | 1 | 4 |
| 4 | 1 | (1,4) | 1 | 4 |
| 4 | 5 | (4,5) | 1 | 4 |
| 4 | 6 | (4,6) | 1 | 4 |
| 5 | 3 | (3,5) | 1 | 4 |
| 5 | 4 | (4,5) | 1 | 4 |
| 5 | 6 | (5,6) | 1 | 4 |
| 6 | 2 | (2,6) | 1 | 4 |
| 6 | 4 | (4,6) | 1 | 4 |
| 6 | 5 | (5,6) | 1 | 4 |

FIG. 5

| LINK GROUP | SRLG |
|---|---|
| ( 1, 2 ) | 1 |
| ( 1, 3 ) | 2 |
| ( 1, 4 ) | 3 |
| ( 2, 6 ) | 4 |
| ( 3, 5 ) | 5, 9 |
| ( 4, 5 ) | 6, 9 |
| ( 4, 6 ) | 7 |
| ( 5, 6 ) | 8 |

FIG. 6

| PATH | LINK GROUP | SRLG |
|---|---|---|
| 20 - 1 | ( 1, 3 ) ( 3, 5 ) | 2, 5, 9 |
| 21 - 1 | ( 1, 4 ) ( 4, 6 ) ( 5, 6 ) | 3, 7, 8 |

FIG. 7

| PORT | ADJACENT NODE | PORT OF ADJACENT NODE | STATE |
|---|---|---|---|
| 0 | CLIENT | 0 | UNUSED |
| 1 | CLIENT | 1 | UNUSED |
| 2 | 2 | 1 | UNUSED |
| 3 | 2 | 2 | UNUSED |
| 4 | 2 | 3 | UNUSED |
| 5 | 2 | 4 | UNUSED |
| 6 | 3 | 1 | UNUSED |
| 7 | 3 | 2 | UNUSED |
| 8 | 3 | 3 | UNUSED |
| 9 | 3 | 4 | UNUSED |
| 10 | 4 | 1 | UNUSED |
| 11 | 4 | 2 | UNUSED |
| 12 | 4 | 3 | UNUSED |
| 13 | 4 | 4 | UNUSED |

FIG. 8

| PATH | UPSTREAM NODE | UPSTREAM PORT | DOWNSTREAM NODE | DOWNSTREAM PORT |
|---|---|---|---|---|
| 20 - 1 | CLIENT | 0 | 3 | 6 |
| 21 - 1 | CLIENT | 0 | 4 | 10 |

FIG. 9

| NODE | ADJACENT NODE | LINK GROUP | METRIC | NUMBER OF AVAILABLE LINKS |
|---|---|---|---|---|
| 1 | 2 | (1,2) | 1 | 4 |
| 1 | 3 | (1,3) | 1 | 3 |
| 1 | 4 | (1,4) | 1 | 3 |
| 2 | 1 | (1,2) | 1 | 4 |
| 2 | 6 | (2,6) | 1 | 4 |
| 3 | 1 | (1,3) | 1 | 4 |
| 3 | 5 | (3,5) | 1 | 3 |
| 4 | 1 | (1,4) | 1 | 4 |
| 4 | 5 | (4,5) | 1 | 4 |
| 4 | 6 | (4,6) | 1 | 3 |
| 5 | 3 | (3,5) | 1 | 4 |
| 5 | 4 | (4,5) | 1 | 4 |
| 5 | 6 | (5,6) | 1 | 3 |
| 6 | 2 | (2,6) | 1 | 4 |
| 6 | 4 | (4,6) | 1 | 4 |
| 6 | 5 | (5,6) | 1 | 4 |

FIG. 10

| PORT | ADJACENT NODE | PORT OF ADJACENT NODE | STATE |
|---|---|---|---|
| 0 | CLIENT | 0 | INUSE |
| 1 | CLIENT | 1 | UNUSED |
| 2 | 2 | 1 | UNUSED |
| 3 | 2 | 2 | UNUSED |
| 4 | 2 | 3 | UNUSED |
| 5 | 2 | 4 | UNUSED |
| 6 | 3 | 1 | INUSE |
| 7 | 3 | 2 | UNUSED |
| 8 | 3 | 3 | UNUSED |
| 9 | 3 | 4 | UNUSED |
| 10 | 4 | 1 | INUSE |
| 11 | 4 | 2 | UNUSED |
| 12 | 4 | 3 | UNUSED |
| 13 | 4 | 4 | UNUSED |

| PATH | UPSTREAM NODE | UPSTREAM PORT | DOWNSTREAM NODE | DOWNSTREAM PORT |
|---|---|---|---|---|
| 20 - 1 | CLIENT | 0 | 3 | 6 |
| 21 - 1 | CLIENT | 0 | 4 | 10 |
| 20 - 2 | CLIENT | 1 | 2 | 2 |
| 21 - 2 | CLIENT | 1 | 4 | 10 |

| PATH | LINK GROUP | SRLG |
|---|---|---|
| 20 - 1 | ( 1, 3 ) ( 3, 5 ) | 2, 5, 9 |
| 21 - 1 | ( 1, 4 ) ( 4, 6 ) ( 5, 6 ) | 3, 7, 8 |
| 20 - 2 | ( 1, 2 ) ( 2, 6 ) | 1, 4 |
| 21 - 2 | ( 1, 4 ) ( 4, 6 ) | 3, 7 |

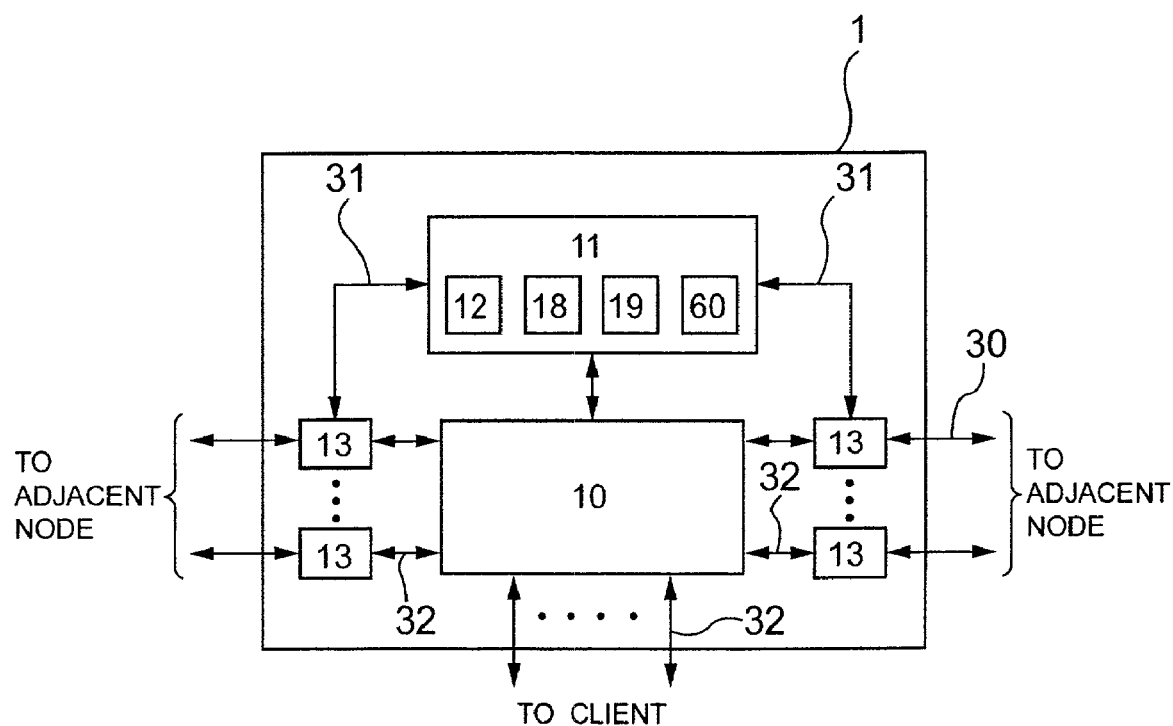

FIG. 21

| NODE | ADJACENT NODE | LINK GROUP | METRIC | NUMBER OF AVAILABLE LINKS |
|---|---|---|---|---|
| 5a | 2b | ( 5a, 2b )<br>40-ab | 1 | 4 |
| 6a | 1c | ( 6a, 1c )<br>40-ac | 1 | 4 |

COMMUNICATION NETWORK, PATH SETTING METHOD AND RECORDING MEDIUM HAVING PATH SETTING PROGRAM RECORDED THEREON

BACKGROUND OF THE INVENTION

1. Field of the Invention

The present invention relates to a communication network, a path setting method, and a recording medium having a path setting program recorded thereon, and more particularly to a communication network, a path setting method, and a recording medium having a path setting program recorded thereon in a mesh type communication network.

2. Description of the Related Art

Methods for forming a mesh type network in a public communication network includes a methods using a cross connecting unit by Synchronous Optical Network (SONET) or Synchronous Digital Hierarchy (SDH) technique, or a method using a cross connecting unit by Asynchronous Transfer Mode (ATM) technique, and various failure recovery schemes are proposed in each method. A failure recovery scheme proposed in T. Wu, "Fiber Network Service Survivability," Artech House, 1992, Chapter 5 can be classified into a centralized control scheme and a decentralized control scheme. The centralized control scheme is a scheme for controlling almost all processing steps concerning failure recovery in a network or a subnetwork in one centralized control unit, and alarms indicating failure detection are once centralized in the centralized control unit, and then the centralized control unit determines a proceeding step to be next performed based on the alarms, and instructs several related nodes to perform the proceeding step to detour communication traffic from a link or a node where failure occurs. The decentralized control scheme is a scheme in which nodes constituting a network perform failure recovery processing in an autonomously decentralized manner.

The failure recovery scheme can be also classified into a preplanned scheme and a dynamic scheme. In the preplanned scheme, a route of an alternate path is previously calculated with respect to a primary path, and occurrence of failure immediately causes switch to the alternate path. In the dynamic scheme, a route of an alternate path is calculated after detection of failure, and finding the route causes switch to the alternate path. The preplanned scheme is classified into a 1+1 and 1:1 scheme in which one alternate path is prepared with respect to one primary path, 1:n scheme in which n (an integer not less than 2) primary paths share one alternate path source, and m:n scheme in which n primary paths share m (an integer not less than 2) alternate path sources. Sharing the alternate path source achieves an advantage of increased use efficiency of the source. However, a conflict may occur in such a manner that the plurality of primary paths try to take one alternate path source when multiple failures occur, so that caution must be taken in determining which primary paths share the alternate path source.

Attention has been recently given to technique of applying an improved protocol that is developed for an Internet Protocol (IP) network to an optical network to achieve high speed provisioning and high speed failure recovery of an optical path in the optical network. For example, in Multi-Protocol Label Switching (MPLS) working group of Internet Engineering Task Force (IETF), standardization of control technique of such an optical network is implemented. In an internet draft: draft-many-ip-optical framework-01.txt submitted to the IETF, a concept of Shared Risk Link Group (SRLG) is introduced for facilitating route calculation of an alternate path in failure recovery. The SRLG is a group consisting of a plurality of links sharing the same physical source. Sharing the same physical source means that all the links belonging to the SRLG are affected when failure occurs in the shared physical source. For example, a plurality of optical fibers in the same pipe are simultaneously affected by one failure of cutting of the pipe. In a wavelength division multiplexed optical network, cutting of one optical fiber affects a plurality of wavelengths in the optical fiber. The SRLG is identified by SRLG ID and used in the route calculation of the alternate path. For example, in page 24 of draft-many-ip-optical framework-01.txt, it is described that a primary path and an alternate path should be adapted not to pass links belonging to the same SRLG in 1+1 failure recovery. In page 26 of draft-many-ip-optical framework-01.txt, it is described that alternate paths corresponding to a plurality of primary paths should be able to share one link simply when the plurality of primary paths do not pass links belonging to the same SRLG.

In this application, a group of sources sharing a risk such as SRLG is referred to as a risk sharing resource group. Setting paths in consideration of the risk sharing resource group can prevent a plurality of paths from being simultaneously affected by one failure to make failure recovery impossible.

Examples of path setting methods of this kind are described in National Publication of International Patent Application No. 11-508421, Japanese Patent Laid-Open No. 9-224026 and Japanese Patent No. 2770749.

To calculate the primary path or alternate path in consideration of the risk sharing resource group, it is necessary to know to which risk sharing resource group the source such as the link or node in the network belongs. Specifically, in the decentralized control scheme, all nodes must perform route calculation to thereby respectively have risk sharing resource group information of the entire network. With increasing size of the network, the amount of information becomes enormous to require that each node has a large amount of memory source.

When a link of alternate paths corresponding to a plurality of primary paths are to be shared, in order to determine whether a link used in calculation of an alternate path corresponding to a certain primary path can be shared with alternate paths corresponding to other primary paths, it is also necessary to know which link other all primary paths and alternate paths corresponding thereto pass. Path information is often updated in accordance with set or release of the path, so that there is a problem that when all nodes have the pass information of the entire network in the decentralized control scheme, traffic for transmission of the pass information between the nodes significantly increases. This problem also becomes more noticeable with increasing size of the network.

One of means for solving the problems is, as described in page 26 of draft-many-ip-optical framework-01.txt, to prepare a route server having all necessary information such as topology information of a network, information on a risk sharing resource group, or path information, and to perform route calculation of the primary path and alternate path by the centralized control scheme. However, the centralized control scheme has the following problems: 1) when the size of the network is large, load of route calculation centralized in a route server becomes too large; 2) when failure occurs in the route server, route calculation can be no longer performed to cause lower failure resistance than the decentralized control scheme.

Specifically, in the conventional techniques, there are two path setting methods:

(A) a method for imparting all information to the nodes; and (B) a method for imparting all information to the centralized control unit. However, (A) has a problem that traffic for synchronizing the information between the nodes becomes enormous, and (B) has a problem that load of calculation is centralized in the centralized control unit.

SUMMARY OF THE INVENTION

An object of the present invention is to provide a communication network, a path setting method, and a recording medium having a path setting program recorded thereon capable of preventing load of route calculation from being centralized in part of units, and capable of preventing traffic between nodes from increasing.

In order to solve the above described problems, a first aspect of the present invention provides a communication network including: a plurality of nodes constituting a network; and a management center connected to each of the nodes, wherein each of the nodes has topology information of the network, and the management center has information on a risk sharing resource group.

A second aspect of the present invention provides a management center connected to a plurality of nodes constituting a network, wherein the management center has information on a risk sharing resource group, and when each of the nodes calculates a first path and a second path having different routes, the management center sends the information on the risk sharing resource group to the node.

A third aspect of the present invention provides a plurality of nodes constituting a network, wherein each of the nodes has topology information of the network, and when calculating a first path and a second path having different routes, the node obtains information on a risk sharing resource group from a management center connected to the node.

A fourth aspect of the present invention provides a path setting method in a communication network including a plurality of nodes constituting a network and a management center connected to each of the nodes, wherein each of the nodes has topology information of the network, and the management center has information on a risk sharing resource group, and the method includes: a first step in which a source node refers to the topology information of the network to calculate a route of a first path and send the route obtained to the management center; a second step in which the management center refers to the information on the risk sharing resource group to return a list of a link group not belonging to the risk sharing resource group that the route sent from the source node passes to the source node; and a third step in which the source node refers to the list sent from the management center to calculate a route of a second path.

A fifth aspect of the present invention provides a recording medium having a path setting program recorded thereon for controlling a node in a communication network including a plurality of nodes constituting a network and a management center connected to each of the nodes, wherein each of the nodes has topology information of the network, and the management center has information on a risk sharing resource group, and the medium includes: a first step in which a source node refers to the topology information of the network to calculate a route of a first path and send the route obtained to the management center; a second step in which the management center refers to the information on the risk sharing resource group to return a list of a link group not belonging to the risk sharing resource group that the route sent from the source node passes to the source node, and then the source node refers to the list sent from the management center to calculate a route of a second path.

A sixth aspect of the present invention provides a recording medium having a path setting program recorded thereon for a management center in a communication network including a plurality of nodes constituting a network, and a management center connected to each of the nodes, wherein each of the nodes has topology information of the network, and the management center has information on a risk sharing resource group, and the medium includes a first step in which a source node refers to the topology information of the network to calculate a route of a first path and send the route obtained to the management center, and then the management center refers to the information on the risk sharing resource group to return a list of a link group not belonging to the risk sharing resource group that the route sent from the source node passes to the source node, and the source node refers to the list sent from the management center to calculate a route of a second path.

According to the first to sixth aspects of the present invention, load of route calculation is decentralized to the nodes and the management center to thereby prevent the load of the route calculation from being centralized in part of units.

BRIEF DESCRIPTION OF THE DRAWINGS

FIG. 4 shows a topology table 12;

FIG. 5 shows an SRLG table 16;

FIG. 6 shows a path table 17;

FIG. 7 shows a port table 19;

FIG. 8 shows a routing table 18;

FIG. 9 shows a topology table 12;

FIG. 10 shows a port table 19;

FIG. 19 shows a configuration of a node 1;

FIG. 20 shows an external routing table 60;

FIG. 21 shows a topology table 12;

DESCRIPTION OF THE PREFERRED EMBODIMENT

Figure 1:
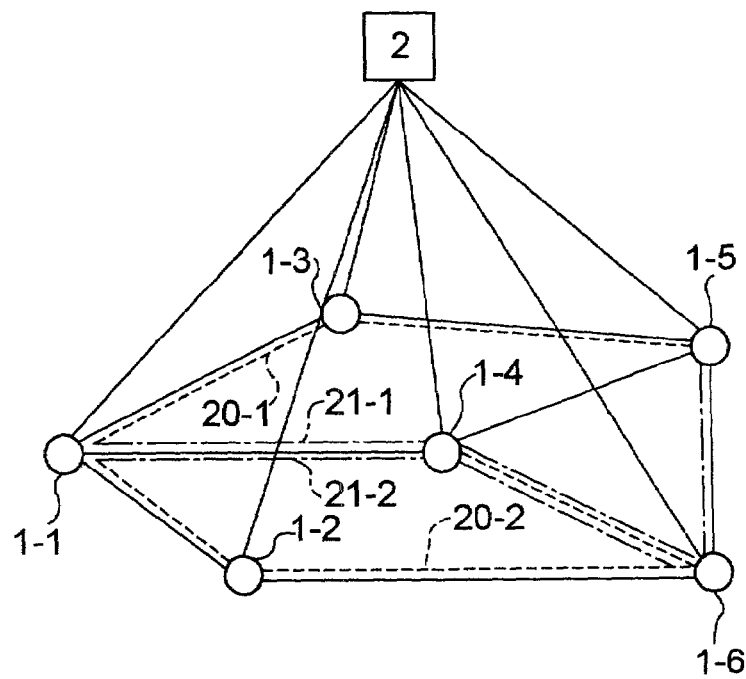
FIG. 1 shows a configuration of a network according to a first embodiment of the invention.

Now, embodiments of the present invention will be described with reference to the accompanying drawings. A first embodiment will be described first. FIG. 1 shows a configuration of a network of a first embodiment. With reference to the drawing, six nodes 1 (1-1 to 1-6) are linked by a two-way link group consisting of four two-way links. In this embodiment, such a link group is provided by preparing a 4 wavelength division multiplexing transmission line for uplink and downlink, respectively, and a transmission format of the link is STM-16 of SDH. A link group between the node 1-1 and node 1-3 will be hereinafter referred to as (1, 3). This network includes a management center 2 connected to all nodes 1.

Figure 2:
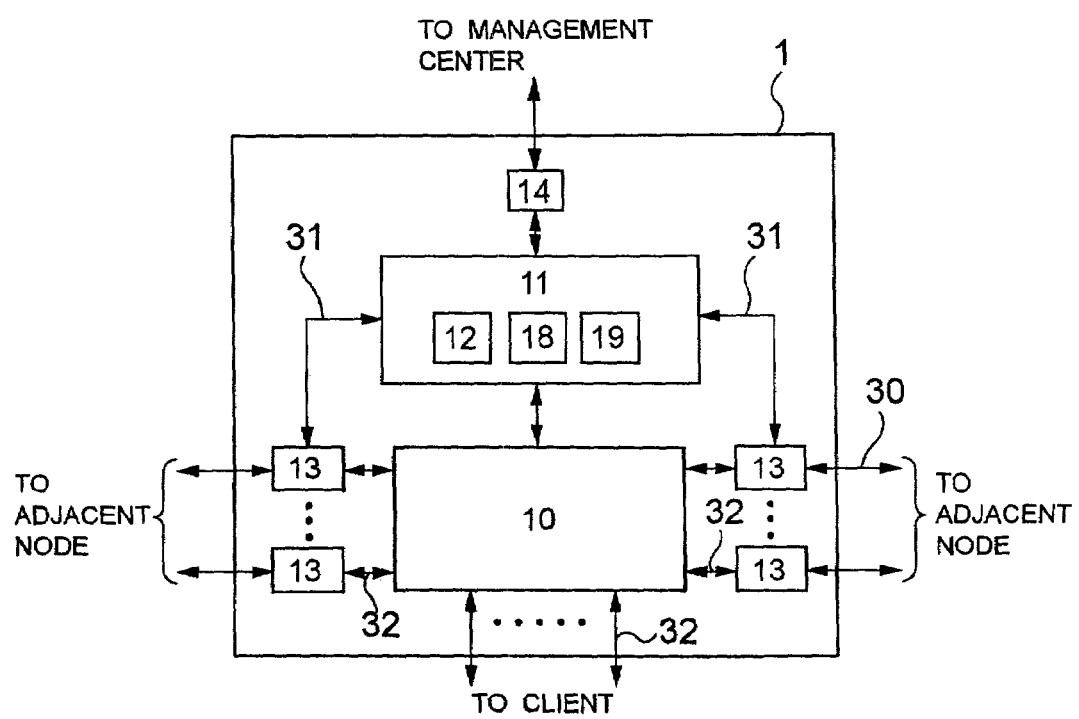
FIG. 2 shows a configuration of a node 1.

FIG. 2 shows a configuration of the node 1. With reference to the drawing, for a link 30 connected to an adjacent node, Section Over Head only is terminated by a transponder 13 of SDH and converted to a station interface 32. The node 1 is also connected to a client (not shown in FIG. 1) by a station interface 32. These station interfaces 32 are switched by a switch 10. A data communication channel (D1 to D3 bytes) of the Section Over Head of one link 30 in the link group is used as a control channel 31, and the control channel 31 is connected to a node control unit 11. With the control channel 31, the node control unit 11 can communicate with a node control unit 11 of an adjacent node. The node control unit 11 includes a topology table 12 showing a connection state of the entire network, a routing table 18 showing connection of the switch 10 in this node, and a port table 19 showing a connection relationship between ports of the adjacent node and this node (FIG. 7). The node control unit 11 can communicate with the management center 2 via a communication interface 14.

Figure 3:
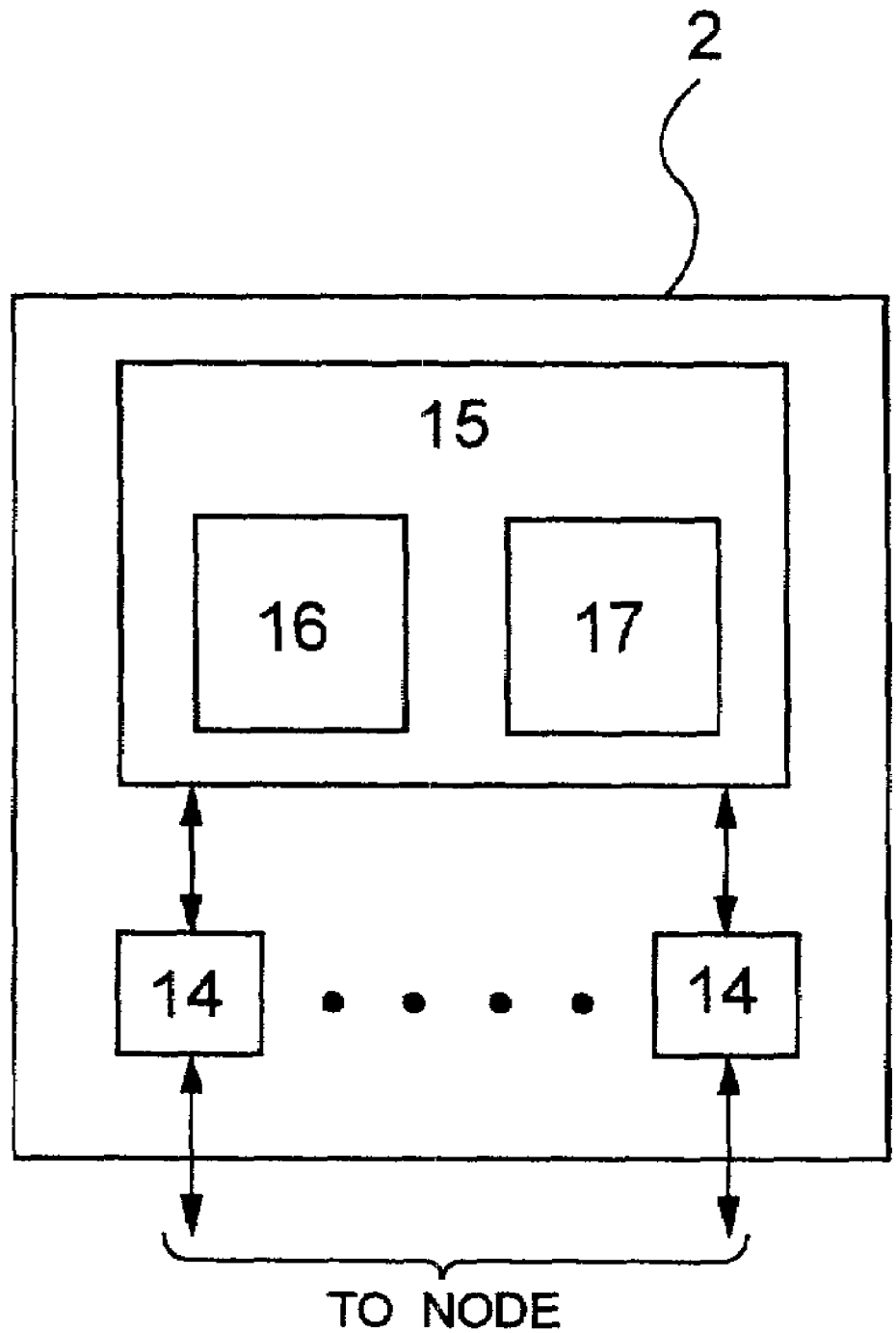
FIG. 3 shows a configuration of a management center 2.

FIG. 3 shows a configuration of the management center 2. With reference to the drawing, the management center 2 includes a centralized control unit 15, which is connected to all nodes 1 via the communication interface 14. The centralized control unit 15 stores an SRLG table 16 showing a relationship between the link group and SRLG, and a path table 17 in which routes and SRLGs of a primary path and an alternate path currently set are recorded.

Next, operation of the first embodiment will be described with reference to the flowcharts. FIGS. 24 to 27 are flowcharts showing the operation of the first embodiment. In the flowcharts, at a front of a description of each step, operation of the node is indicated by (N), and operation of the management center is indicated by (K).

First, setting two-way primary path 20-1 and alternate path 21-1 whose source node is a node 1-1 and whose destination node is a node 1-5 will be considered. Since they are two-way paths, there is no source or destination in terms of flow of data, but for convenience, a node that is a source of path setting is set as a source node, and an opposite end is set as a destination node. Seen from a certain node, a source side is referred to as upstream, and a destination side is referred to as downstream.

On this network, in order for each node to understand topology of the entire network, for example, a link state routing protocol operates such as an extended Open Shortest Path First (OSPF) protocol described in K. Kompella et al., "OSPF Extensions in Support of MPL(ambda)S," draft-kompella-ospf-ompls-extensions-00.txt, IETF Internet Draft, July, 2000. Therefore, the topology tables 12 of all nodes are synchronized. The topology table 12 at this time is as shown in FIG. 4. Here, the node 1-3 is simply indicated as 3. For example, line 1 of FIG. 4 shows that the node 1-1 is adjacent to a node 1-2, a metric of a link group (1, 2) connecting both nodes is 1, and the number of currently available links is 4. The same information is also written in line 4. That is, the node 1-2 is adjacent to the node 1-1, the metric of the link group (1, 2) connecting both nodes is 1, and the number of currently available links is 4. The metric is cost of a link used for route calculation, and the number of hops is set as the metric here.

The node control unit 11 of the node 1-1 refers to the topology table 12 to calculate the shortest route from the node 1-1 to node 1-5 that simply passes link groups having one or more available links, using a Constrained Shortest Path First (CSPF) algorithm that is a calculation algorithm of the shortest route under certain constrained conditions (S1). The CSPF algorithm is described, for example, in B. Davie et al., "MPLS Technology and Applications," Morgan Kaufmann Publishers, 2000, pages 175 to 180. This calculation provides routes of link groups (1, 3), (3, 5) and routes of link groups (1, 4), (4, 5). In this embodiment, when a plurality of routes are obtained, a route having the smallest node number of the hop next the source node is selected, and the routes (1, 3), (3, 5) are selected here to be the routes of the primary path 20-1. Then, the node 1-1 calculates the shortest route from the node 1-1 to node 1-5 that simply passes link groups having one or more available links except the link groups (1, 3), (3, 5), also using the CSPF algorithm. This calculation provides the routes (1, 4), (4, 5) to be the routes of the alternate path 21-1 (different from the routes shown in FIG. 1) (S1).

Then, the node 1-1 sends the routes of the obtained primary path 20-1 and alternate path 21-1 to the management center 2 (S2). The centralized control unit 15 of the management center 2 refers to the SRLG table 16 to check SRLG that the routes of the primary path 20-1 and alternate path 21-1 sent from the node 1-1 pass (S3). Here, the SRLG table 16 is, for example, as shown in FIG. 5. Line 5 of this drawing shows that the link group (3, 5) belongs to two SRLGs of SRLG 5 and SRLG 9. The SRLGs that the primary path 20-1 passes are SRLGs 2, 5, 9, and the SRLGs that the alternate path 21-1 passes are SRLGs 3, 6, 9, and it is found that SRLG 9 is an overlap between both paths (Y in S4). That is, failures may occur simultaneously in the primary path 20-1 and alternate path 21-1. Thus, the management center 2 sends a rejection message with the link group number (4, 5) of overlapping SRLG to the node controlling unit 11 of the node 1-1 (S5).

The node 1-1 having received the rejection message calculates the shortest route from the node 1-1 to node 1-5 that passes link groups having one or more available links except the link group (4, 5) as well as the link groups (1, 3), (3, 5) (S6). This provides the routes (1, 4), (4, 6), (5, 6) to be new routes of the alternate path 21-1.

The node 1-1 again sends the new paths of the primary path 20-1 and alternate path 21-1 to the management center 2 (S7). The centralized control unit 15 of the management center 2 again refers to the SRLG table 16 (S3) to find that the new alternate path 21-1 passes SRLGs 3, 7, 8. These SRLGs do not overlap the SRLGs 2, 5, 9 that the primary path 20-1 passes (N in S4, S8).

The management center 2 searches for an alternate path having a route overlapping the route of the alternate path 21-1 in the path table 17 (S9), but there is no such alternate path at this time (N in S10). Thus, the management center 2 sends a permission message to the node 1-1 (S12), and records the routes and SRLGs of the primary path 20-1 and alternate path 21-1 in the path table 17 (S11). A state of the path table 17 at this time is shown in FIG. 6.

The node control unit 11 of the node 1-1 having received the permission message refers to the port table 19 to set the routing table 18 for the primary path 20-1 (S13). The port table 19 of the node 1-1 is as shown in FIG. 7. FIG. 7 shows that a port 0 of the node 1-1 is connected to a port 0 of the client, a port 1 to a port 1 of the client, ports 2 to 5 to ports 1 to 4 of the node 1-2, ports 6 to 9 to ports 1 to 4 of the node 1-3, ports 10 to 13 to ports 1 to 4 of the node 1-4, and all the ports are unused. The node 1-1 is the source node of the primary path 20-1, and thus it is determined that an upstream node is the client. Among unused ports connected to the client, the port 0 having the smallest number is selected as an upstream port. A downstream node of the primary path 20-1 is the node 1-3, and a port 6 having the smallest number is selected from unused ports connected to the node 1-3 as a downstream port. Thus, the routing table 18 of the node 1-1 for the primary path 20-1 is set as in line 1 of FIG. 8. Then, the node 1-1 signals to the node 1-3 via the control channel 31 to indicate that the downstream port 6 allocated to the primary path 20-1 by the node 1-1 is connected to the port 1 of the node 1-3. The node 1-3 having received it writes the upstream node of the primary path 20-1 being the node 1-1 and the upstream port being the port 1 in the routing table 18. Next, the node 1-3 selects a downstream port to be connected to the downstream node 1-5 in the same manner as the node 1-1 does, and writes it in the routing table 18. The routing table of the node 1-3 for the 20-1 is now completed. Further, the node 1-3 signals to the node 1-5 to indicate the number of port of the node 1-5 to which the downstream port allocated to the primary path 20-1 is connected. The node 1-5 writes the port number in its own routing table 18 as the upstream port. The node 1-5 is a destination and thus the downstream node is the client, and the node 1-5 selects the downstream port connected to the client and also writes it in the routing table 18. In this way, the routing tables 18 of all the nodes on the primary path 20-1 are set. The nodes 1-1, 1-3, 1-5 control the switch 10 in accordance with the routing table 18 to open the primary path 20-1 (S14). As the signaling protocol, extended Resource Reservation Protocol (RSVP) described in D. Saha et al., "RSVP Extensions for Signaling Optical Paths," draft-saha-rsvp-optical-signaling-00.txt, IETF Internet Draft, 2000 may be used.

Then, the node 1-1 sets the routing table 18 for the alternate path 21-1 as in line 2 of FIG. 8 (S15). Like the primary path 20-1, signaling from the node 1-1 to nodes 1-4, 1-6, and 1-5 successively while selecting a downstream port in each node causes the routing tables 18 of all the nodes on the alternate path 21-1 to be set. For the alternate path, each node 1 simply sets the routing table 18 and reserves the port, and does not actually open the path (S16).

Next, further setting two-way primary path 20-2 and alternate path 21-2 whose source node is the node 1-1 and whose destination node is the node 1-6 will be considered. At this time, a topology table 12 of the node 1-1 is as shown in FIG. 9.

The node 1-1 refers to the topology table 12 (FIG. 9) to calculate the shortest route from the node 1-1 to node 1-6 that simply passes link groups having one or more available links, using the CSPF algorithm. This calculation provides the routes (1, 2), (2, 6), and routes (1, 4), (4, 6), but the routes (1, 2), (2, 6) are selected in accordance with the above described rule to be the routes of the primary path 20-2 (S1). Then, the node 1-1 calculates the shortest route from the node 1-1 to node 1-6 that simply passes link groups having one or more available links except the link groups (1, 2), (2, 6), also using the CSPF algorithm. This calculation provides the routes (1, 4), (4, 6) to be the routes of the alternate path 21-2 (S1).

Then, the node 1-1 sends the routes of the obtained primary path 20-2 and alternate path 21-2 to the management center 2 (S2). The management center 2 refers to the SRLG table 16 (FIG. 5) (S3) to find that the SRLGs that the primary path 20-2 passes are SRLGs 1, 4, and the SRLGs that the alternate path 21-2 passes are SRLGs 3, 7, and these SRLGs do not overlap (N in S4, S8).

Subsequently, the management center 2 searches for an alternate path having a route overlapping the route of the alternate path 21-2 in the path table 17 (FIG. 6) (S9). This time, the primary path 20-1 and alternate path 21-1 have been recorded in the path table 17 of the management center 2, and the route of the alternate path 21-1 overlap the route of the alternate path 21-1 in the link groups (1, 4), (4, 6) (Y in S10).

In descriptions in the flowcharts, the primary path and alternate path currently set are indicated as the primary path 1 and alternate path 1, and the primary path and alternate path already set are indicated as the primary path 2 and alternate path 2.

The management center 2 compares the SRLGs of the primary path 20-2 and primary path 20-1 corresponding to the alternate path 21-1 (S17) to find that the SRLGs of both of them do not overlap (N in S18).

As a result, the management center 2 sends a permission message to the node 1-1, with the number of the alternate path 21-1 and the numbers of the overlapping link groups (1, 4), (4, 6) added (S20). This is for setting the alternate path 21-2 so as to share links with the alternate path 21-1 in the link groups (1, 4), (4, 6). Simultaneously, the management center 2 records the routes and SRLGs of the primary path 20-2 and alternate path 21-2 in the path table 17 (S19).

The node 1-1 having received the permission message with the number of the alternate path 21-1 and the numbers of the link groups (1, 4), (4, 6) first refers to the port table 19 to set the routing table 18 for the primary path 20-2 (S21). The port table 19 at this time is as shown in FIG. 10. It is determined that an upstream node of the primary path 20-2 is the client, an upstream port is a port 1, a downstream port is the node 1-2, and a downstream port is a port 2, and the node 1-1 writes them in the routing table 18. Then, the node 1-1 signals to the node 1-2 to indicate the port number 1 of the downstream node 1-2 connected to the downstream port 2. The node 1-2 selects the port 1 as the upstream port, selects the downstream port by itself, writes them in the routing table 18, and signals to the node 1-6 that is the downstream node to indicate the upper port number. The node 1-6 is a destination node and thus selects the downstream port from the ports connected to the client and writes it in the routing table. In this way, the routing tables 18 of all the nodes on the primary path 20-2 are set, and in accordance therewith, each node controls the switch 10 to open the primary path 20-2.

Figures 11, 12:
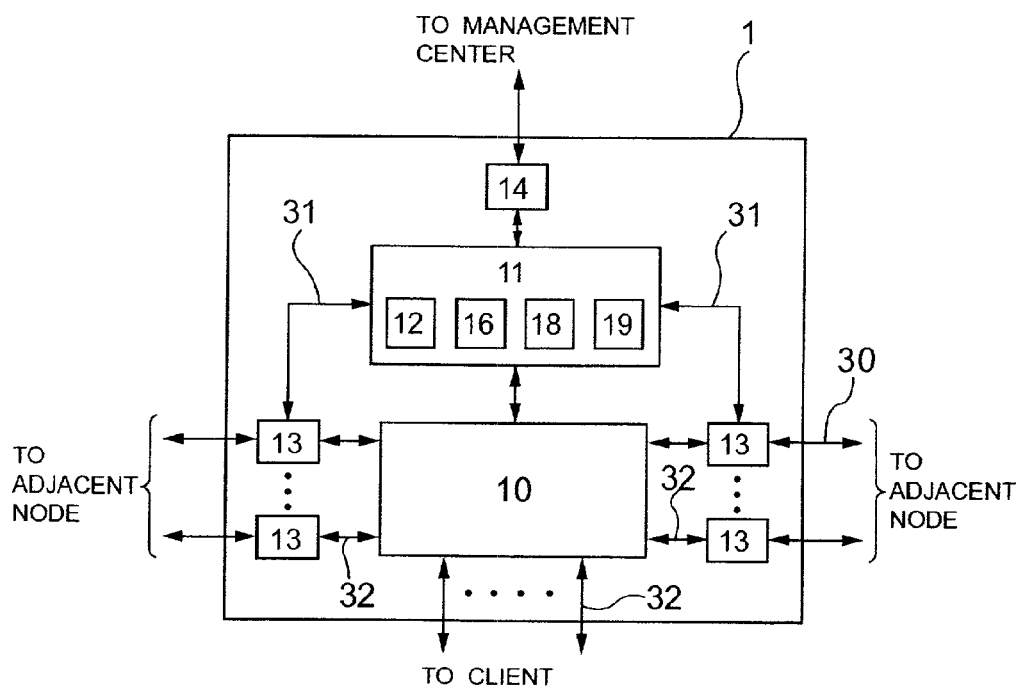
FIG. 11 shows a routing table 18.
FIG. 12 shows a configuration of a node 1.

Then, the node 1-1 sets the routing table 18 for the alternate path 21-2 (S23). The upstream node is the client, the upstream port is the port 1, and the downstream node is the node 1-4. When selecting the downstream port, the node 1-1 is instructed by the management center 2 to have the alternate path 21-1 and alternate path 21-2 share the link in the link group (1, 4) and thus selects the port 10 identical to the downstream port of the alternate path 21-1 as the downstream port of the alternate path 21-2. Therefore, the routing table 18 is set as shown in FIG. 11 (S23). Then, the node 1-1 signals to the node 1-4 to indicate the upstream port number 1. Simultaneously, the node 1-1 instructs the node 1-4 to select the same port as allocated to the alternate path 21-1, as the downstream port to be allocated to the alternate path 21-2. The extended RSVP described above has no such function, but the RSVP can easily extend its function by adding an object. A function of instructing a certain node to allocate the port having allocated to a certain path to another path may be added by adding a new object. Thereafter, similarly signaling from the node 1-4 to node 1-6 causes the routing tables 18 of all the nodes on the alternate path 21-2 to be set (S24).

As described above, two pairs of primary paths and alternate paths respectively having no overlapping SRLG can be set, and two alternate paths can be set to share a link on a certain link group, thereby achieving effective use of source.

Figure 26:
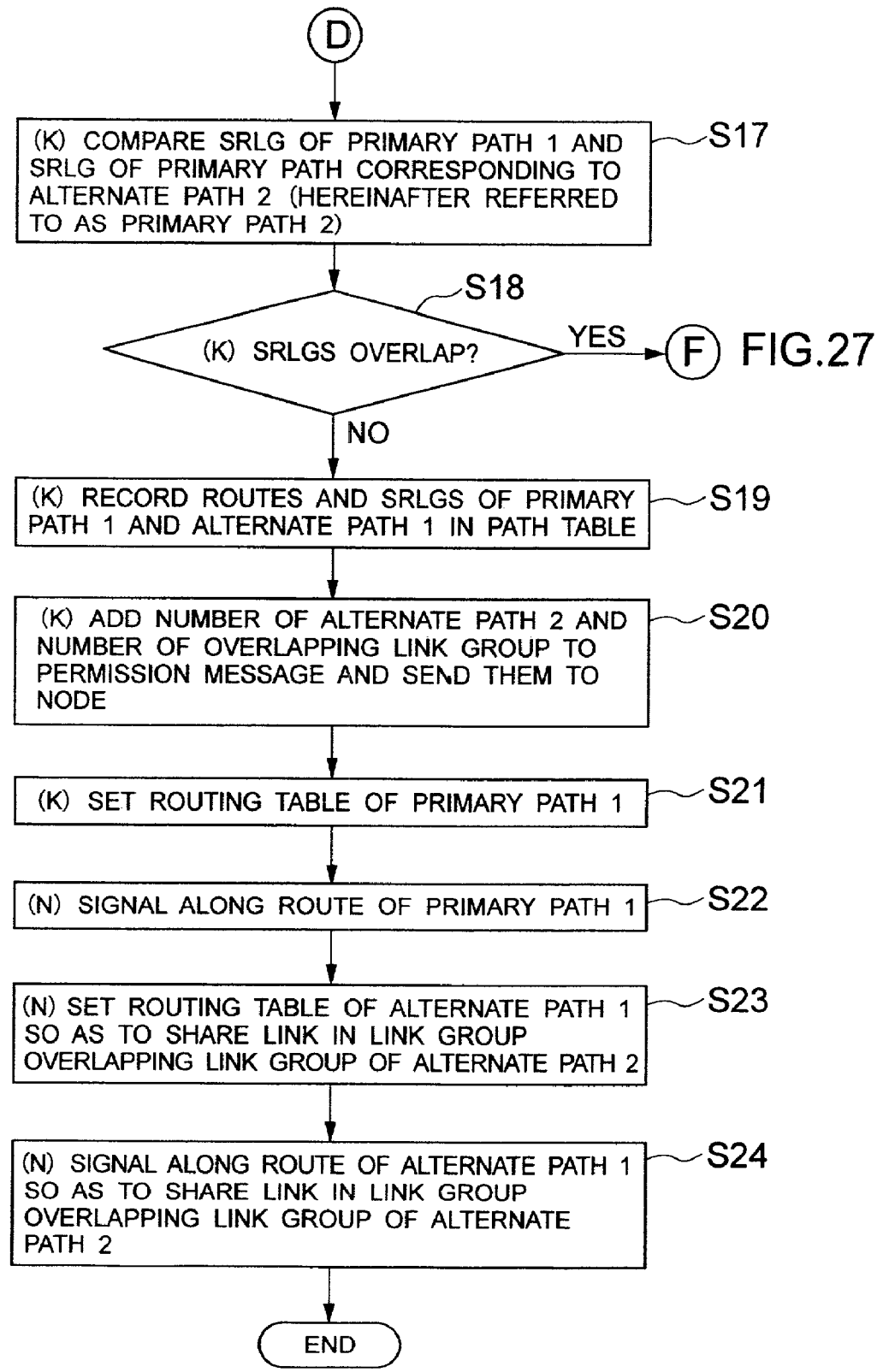
FIG. 26 is a flowchart showing operation of the first embodiment of the invention.
Figure 27:
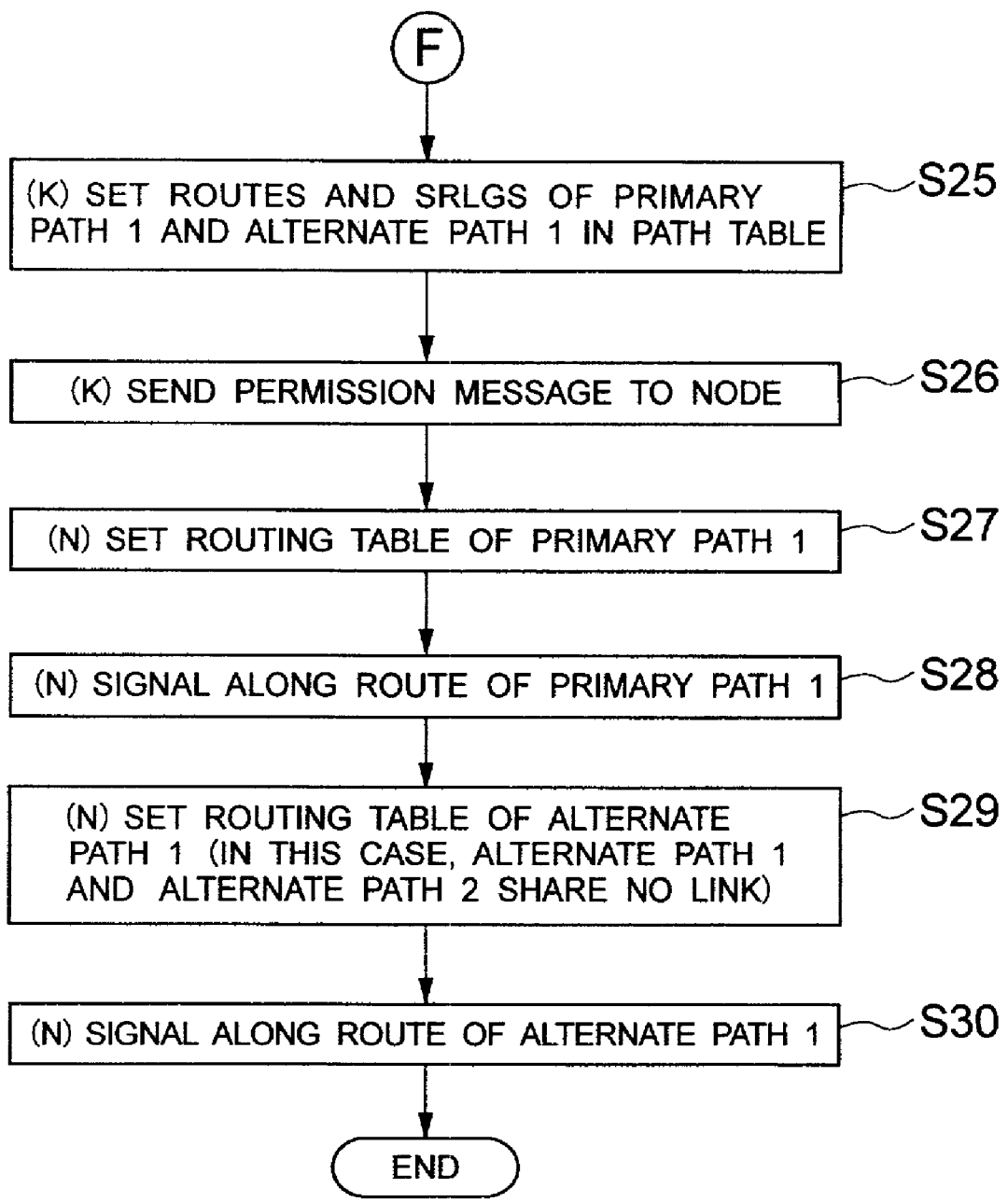
FIG. 27 is a flowchart showing operation of the first embodiment of the invention.

In the above described embodiment, the SRLGs of the primary path 20-1 and alternate path 21-1 do not overlap, but the case where the SRLGs overlap will be now described with reference to FIGS. 26 and 27. When the SRLGs of the primary paths overlap (Y in S18), the respective paths and SRLGs of the primary path 20-1 and alternate path 21-1 are set in the path table (S25).

Then, the management center sends a permission message to the node, but do not add information on the number of the alternate path 21-1 or the number of overlapping link group at this time (S26).

The node 1-1 having received the permission message first refers to the port table 19 and sets the routing table 18 for the primary path 20-2 (S27). Then, the node 1-1 signals to the downstream nodes successively. Thus, the routing tables 18 of all the nodes on the primary path 20-2 are set, and in according therewith, each node controls the switch 10 to open the primary path 20-2 (S28). A series of steps of opening the primary path 20-2 is the same as in the above described example.

Then, the node 1-1 sets the routing table 18 for the alternate path 21-2 (S29). When selecting the downstream port, the node 1-1 is not instructed by the management center 2 to have the alternate path 21-1 and alternate path 21-2 share the link on the overlapping link group, and thus selects a port different from the downstream port of the alternate path 21-1 as the downstream port of the alternate path 21-2. Then, the node 1-1 signals to the node 1-4 to indicate the upstream port number selected in such a manner that the links do not overlap. Thereafter, similarly signaling from the node 1-4 to node 1-6 causes the routing tables 18 of all the nodes on the alternate path 21-2 to be set (S30).

As described above, two pairs of primary paths and alternate paths respectively having overlapping SRLGs can be set, and two alternate paths can be set to have no overlapping link on a certain link group. In this way, even when the SRLGs of the primary paths overlap and simultaneous disconnection may occur, the routes are set in such a manner that links of the alternate paths do not overlap, thereby preventing fatal failure.

Figure 13:
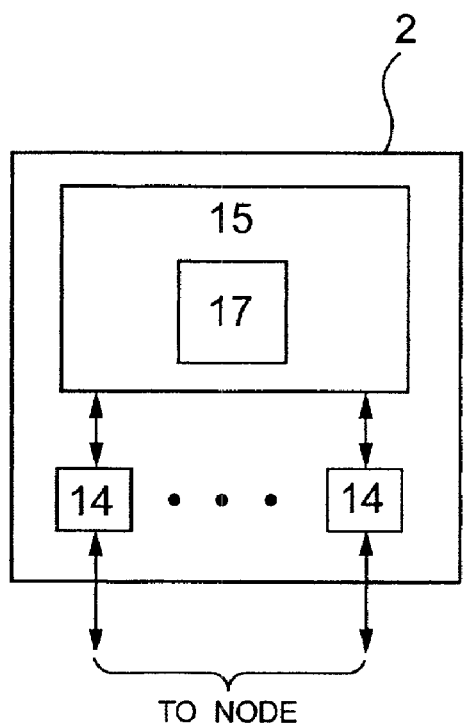
FIG. 13 shows a configuration of a management center 2.

Next, a second embodiment will be described. FIG. 1 is also used in the second embodiment. Configurations of a node 1 and a management center 2 in the second embodiment are shown in FIG. 12 and FIG. 13, respectively. In the second embodiment, a node control unit 11 of the node 1 includes a topology table 12, SRLG table 16, routing table 18, and port table 19, and a centralized control unit 15 of the management center 2 includes a path table 17. The other configurations are identical to those in the first embodiment.

Figure 28:
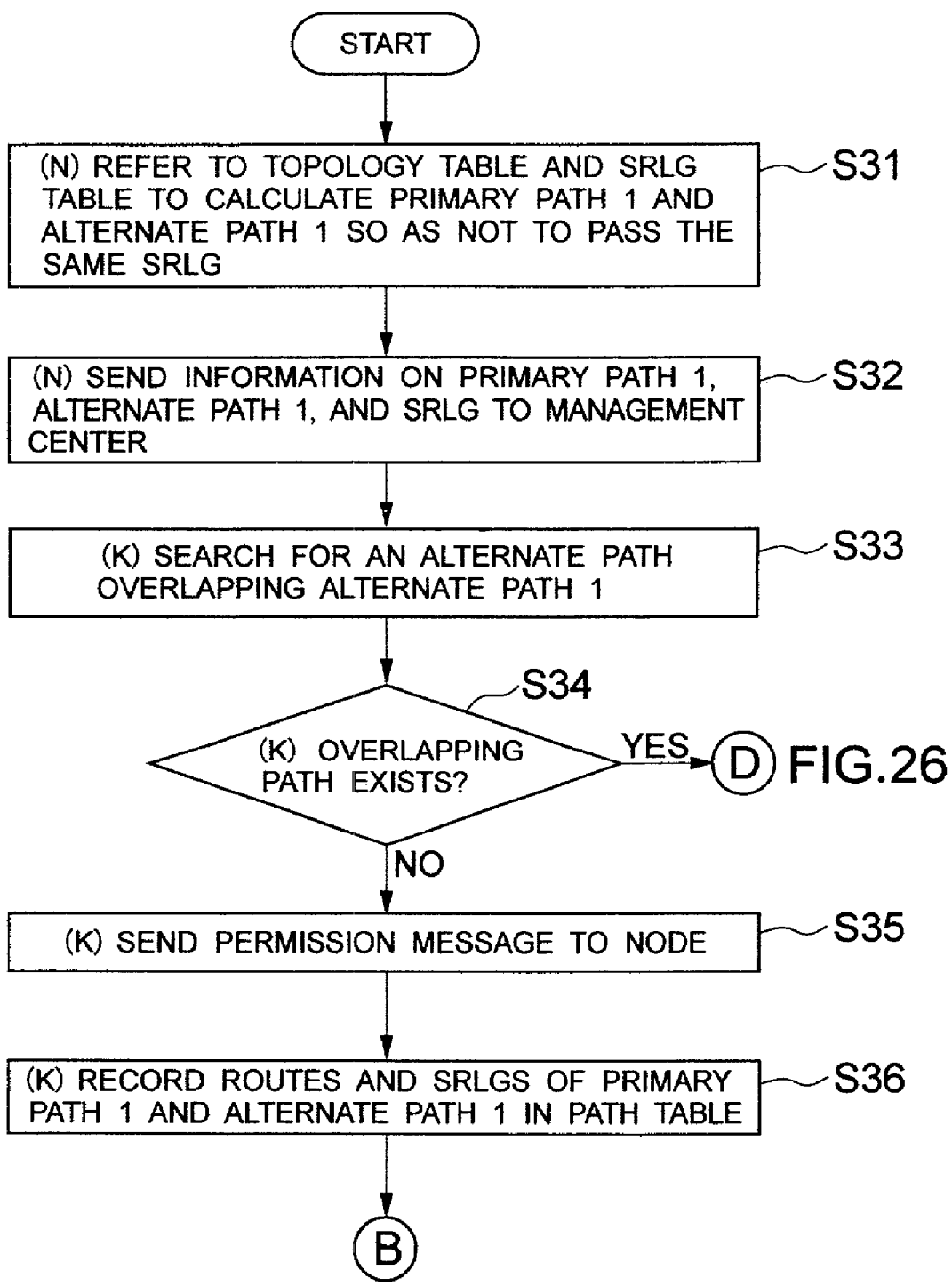
FIG. 28 is a flowchart showing operation of a second embodiment of the invention.

Now, operation of the second embodiment will be described with reference to the flowchart. FIG. 28 is a flowchart showing the operation of the second embodiment. First, setting two-way primary path 20-1 and alternate path 21-1 whose source node is a node 1-1 and whose destination node is a node 1-5 will be considered.

The node 1-1 refers to the topology table 12 and SRLG table 16 to calculate the shortest route and the second shortest route from the node 1-1 to node 1-5 that simply pass link groups having one or more available links in such a manner that both routes do not pass the same SRLG, as routes of the primary path 20-1 and the alternate path 21-1 (S31). An algorithm calculating such a pair of routes is described, for example, in J. Suurballe, "Disjoint Paths in a Network," Networks, vol. 4, 1974. This calculation provides routes (1, 3), (3, 5) as the routes of the primary path 20-1 and routes (1, 4), (4, 6), (5, 6) as the routes of the alternate path 21-1.

The node 1-1 sends information on the routes and passing SRLGs of the primary path 20-1 and alternate path 21-1 to the management center 2 (S32). The management center 2 refers to the path table 17 to search for an alternate path having a route overlapping the route of the alternate path 21-1 (S33), but there is no such alternate path (N in S34). Thus, the management center 2 sends a permission message to the node 1-1 (S35), and records the routes of the primary path 20-1 and alternate path 21-1 in the path table 17 (S36). Therefore, a state of the path table 17 is as shown in FIG. 6.

The node 1-1 having received the permission message signals to nodes 1-3, 1-5 (S14) as in the first embodiment, and thus the routing tables 18 for the primary path 20-1 are set in all the nodes 1 on the primary path 20-1 (S13). The nodes 1-1, 1-3, 1-5 control an optical switch 10 in accordance with the routing table 18 to open the primary path 20-1. Then, the node 1-1 signals to the nodes 1-4, 1-6, 1-5 (S16), and thus the routing tables 18 for the alternate path 21-1 are set in all the nodes 1 on the alternate path 21-1 (S15).

Next, further setting two-way primary path 20-2 and alternate path 21-2 whose source node is the node 1-1 and whose destination node is the node 1-6 will be considered.

The node 1-1 refers to the topology table 12 (FIG. 9) and the SRLG table 16 (FIG. 5) to calculate the shortest route and the second shortest route from the node 1-1 to node 1-6 that simply pass link groups having one or more available links in such a manner that both routes do not pass the same SRLG, as routes of the primary path 20-2 and the alternate path 21-2 (S31). This calculation provides routes (1, 2), (2, 6) as the routes of the primary path 20-2 and routes (1, 4), (4, 6) as the routes of the alternate path 21-2.

Then, the node 1-1 sends the routes obtained of the primary path 20-2 and alternate path 21-2 to the management center 2 (S32). The management center 2 refers to the path table 17 (FIG. 6) to search for an alternate path having a route overlapping the route of the alternate path 21-2 (S33). This time, the primary path 20-1 and alternate path 21-1 have been recorded in the path table 17, and the routes of the alternate path 21-1 overlaps the routes of the alternate path 21-2 in the link groups (1, 4), (4, 6) (Y in S34). The management center 2 compares the SRLGs of the primary path 20-2 and primary path 20-1 corresponding to the alternate path 21-1 (S17) to find that the SRLGs of both of them do not overlap (N in S18).

As a result, the management center 2 sends a permission message to the node 1-1, with the number of the alternate path 21-1 and the numbers of the overlapping link groups (1, 4), (4, 6) added (S20). Simultaneously, the management center 2 records the routes and SRLGs of the primary path 20-2 and alternate path 21-2 in the path table 17 (S19).

Thereafter, in accordance with completely the same steps as in the first embodiment, the primary path 20-2 and alternate path 21-2 are set, and the alternate paths 21-1 and 21-2 share links on the link groups (1, 4), (4, 6).

As described above, two pairs of primary paths and alternate paths respectively having no overlapping SRLG can be set, and two alternate paths can be set to share a link on a certain link group. Processing when the SRLGs of the primary path 1 and primary path 2 overlap is the same as in the first embodiment.

Figure 14:
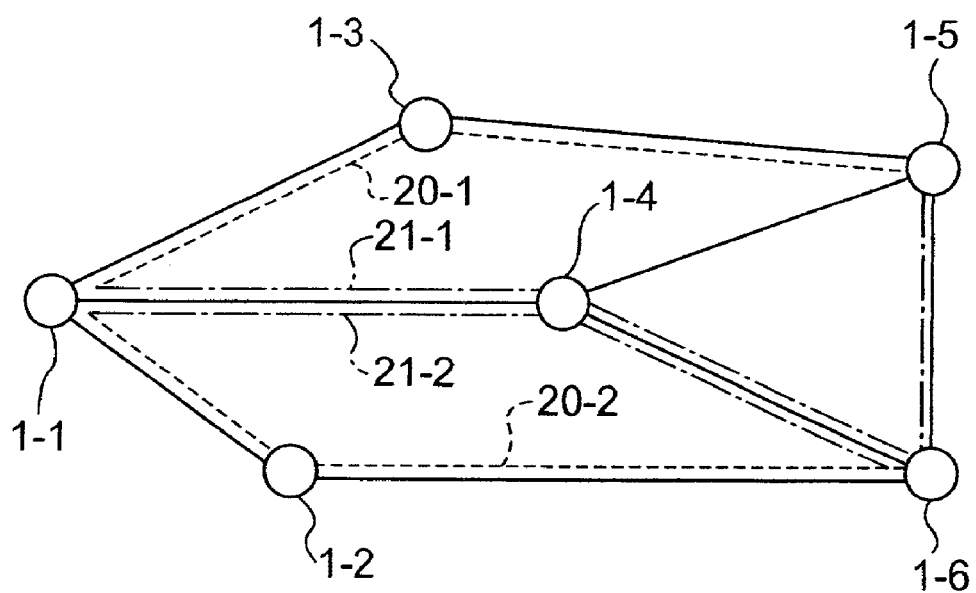
FIG. 14 shows a configuration of a network according to a third embodiment of the invention.
Figures 15, 16:
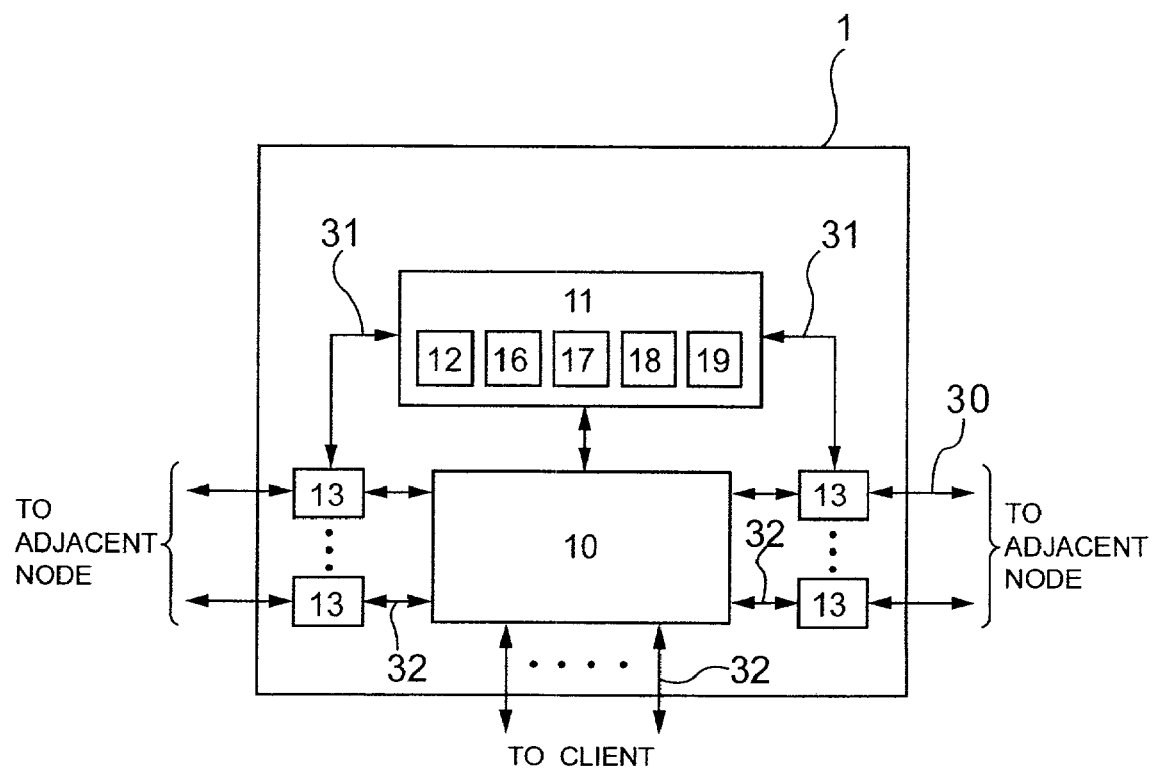
FIG. 15 shows a configuration of a node 1.
FIG. 16 shows a path table 17.

Next, a third embodiment will be described. FIG. 14 shows a configuration of a network of the third embodiment. In the third embodiment, there is no centralized management center. FIG. 15 shows a configuration of a node 1. The node 1 in this embodiment additionally has a path table 17. However, the path table 17 simply records information on a primary path passing the node 1 itself and an alternate path corresponding thereto, or an alternate path passing the node 1 itself and a primary path corresponding thereto. There is no communication interface for communication with the centralized management center. The other configurations are identical to those in the second embodiment.

Figures 29, 30:
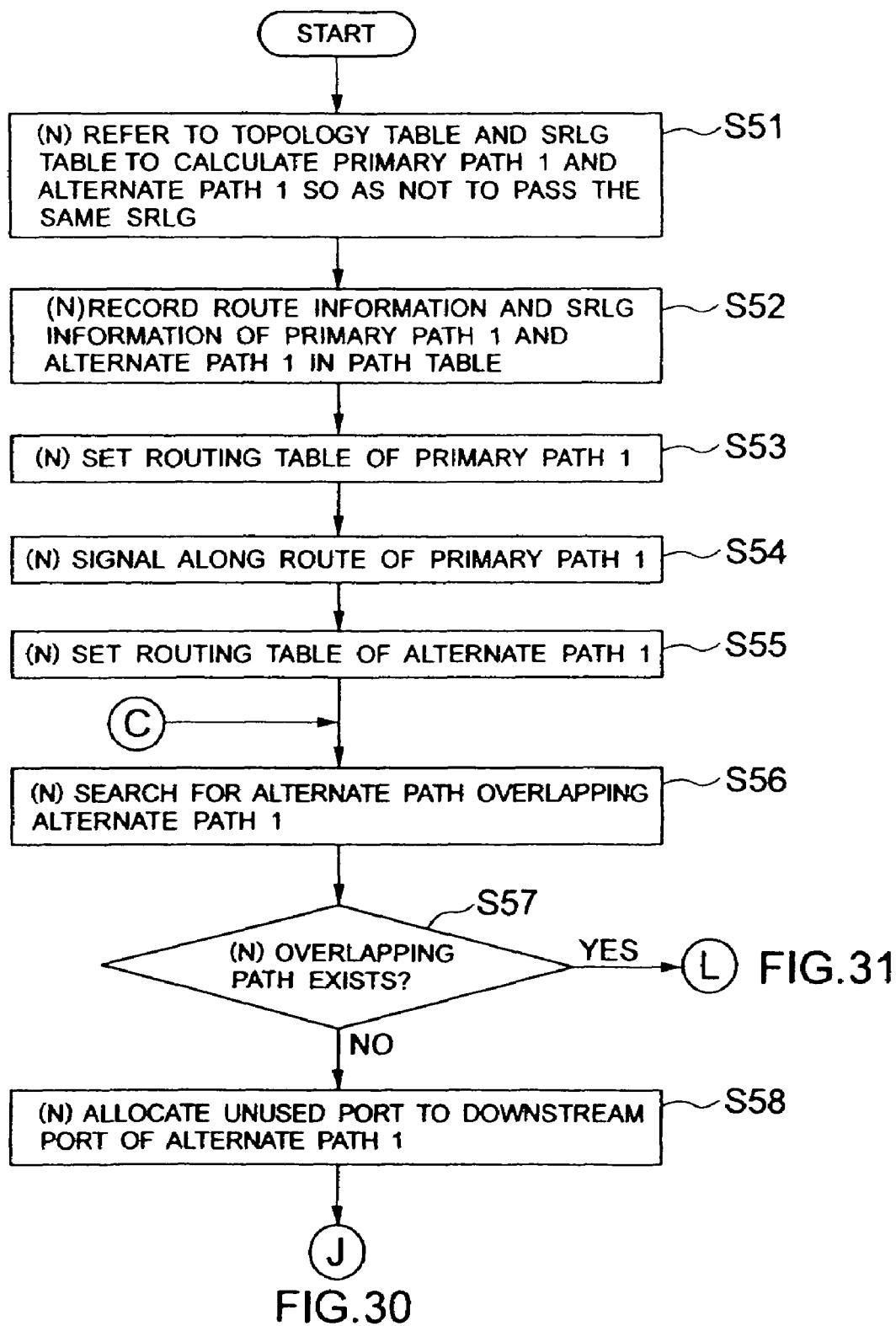
FIG. 29 is a flowchart showing operation of the third embodiment of the invention.
FIG. 30 is a flowchart showing operation of the third embodiment of the invention.
Figure 30:
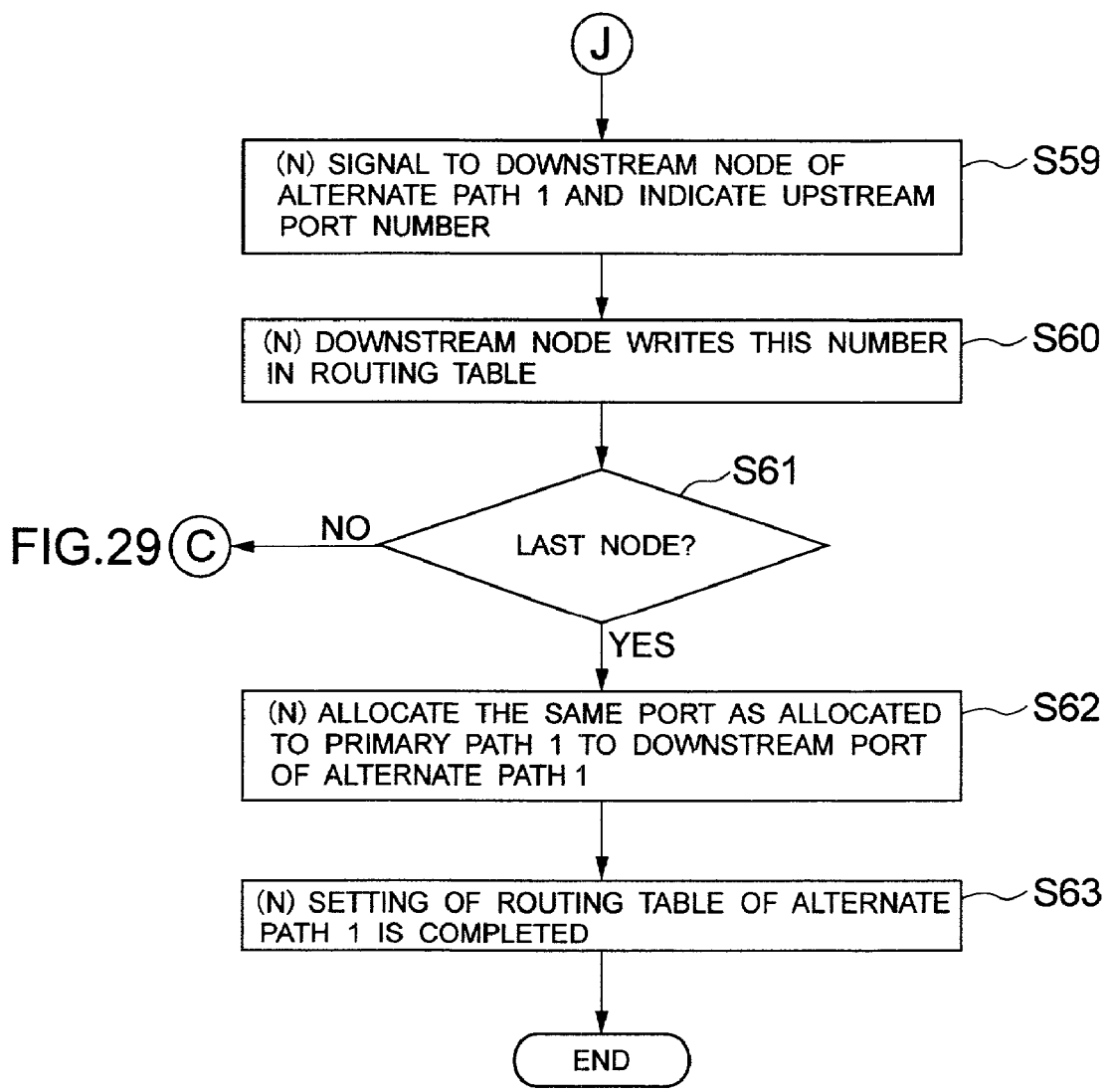
Figure 31:
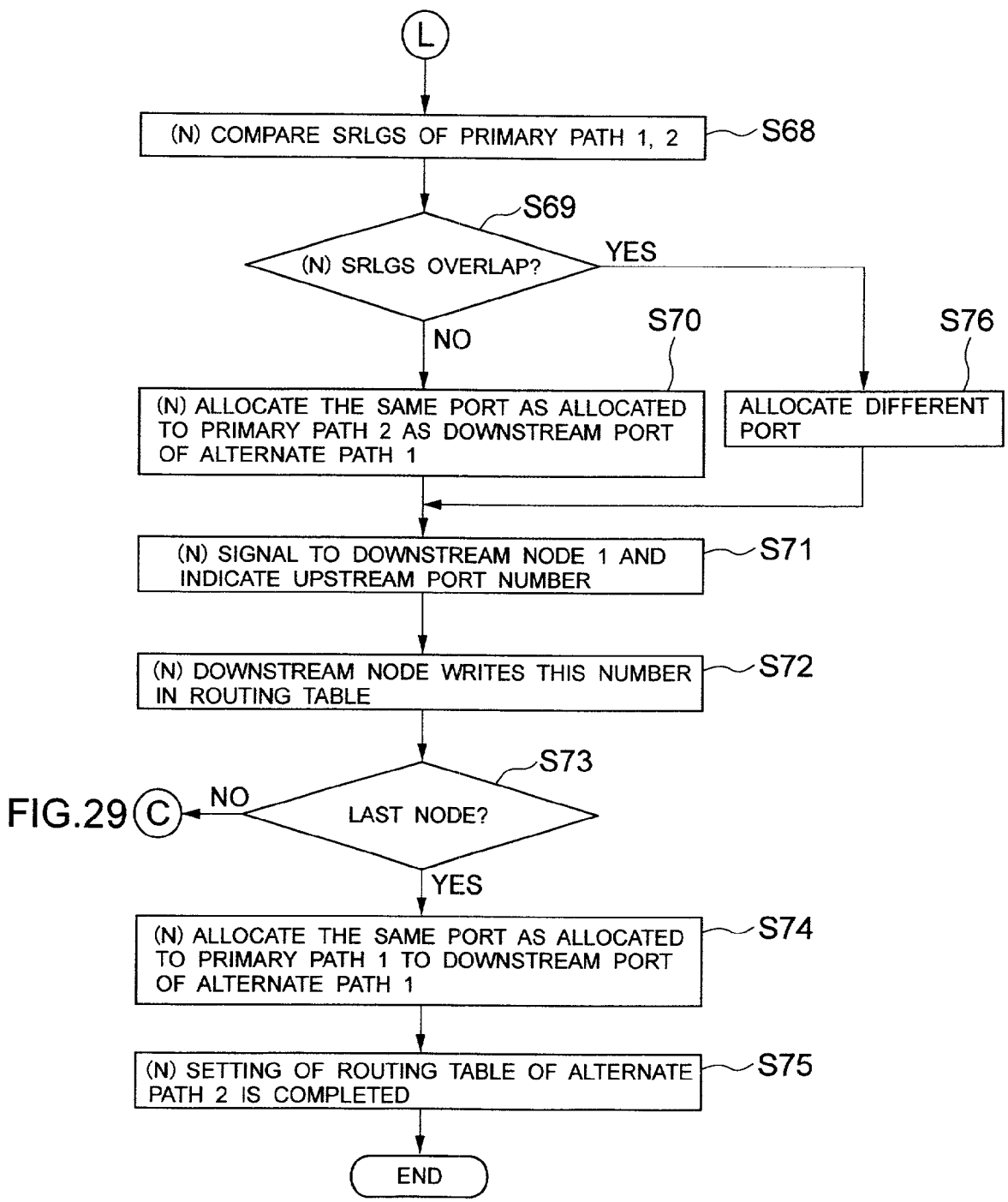
FIG. 31 is a flowchart showing operation of the third embodiment of the invention.

Now, operation of the third embodiment will be described with reference to the flowchart. FIGS. 29 to 31 are flowcharts showing the operation of the third embodiment. First, setting two-way primary path 20-1 and alternate path 21-1 whose source node is a node 1-1 and whose destination node is a node 1-5 will be considered.

The node 1-1 calculates routes of the primary path 20-1 and alternate path 21-1 in the same manner as in the second embodiment, and obtains routes (1, 3), (3, 5) as the routes of the primary path 20-1 and routes (1, 4), (4, 6), (5, 6) as the routes of the alternate path 21-1 (S51). The node 1-1 records information on the routes and SRLGs of the primary path 20-1 and alternate path 21-1 in the path table 17 as shown in FIG. 6 (S52).

Next, the node 1-1 sets the routing table 18 for the primary path 20-1 (S53). The setting manner is the same as in the first embodiment. That is, the routing table 18 is set as in line 1 of FIG. 11.

Then, the node 1-1 signals to a downstream node 1-3 to indicate an upstream port number 1 (S54). The node 1-3 writes the number in its own routing table 18. This signaling also indicates the information on the routes and SRLGs of the primary path 20-1 and alternate path 21-1, and the node 1-3 records the information in its own path table 17. However, it is sufficient for the information to include that of a route of the alternate path 21-1 and SRLGs of the primary path 20-1, at least.

Next, the node 1-3 sets the routing table 18 for the primary path 20-1. The setting manner is the same as in the first embodiment.

Then, the node 1-3 signals to the downstream node 1-5 to indicate an upstream port number. The node 1-5 writes the number in its own routing table 18. This signaling also indicates the information on the routes and SRLGs of the primary path 20-1 and alternate path 21-1, and the node 1-5 records the information in its own path table 17.

Next, the node 1-5 sets the routing table 18 for the primary path 20-1. The setting manner is the same as in the first embodiment.

In this way, setting of the routing tables 18 for the primary path 20-1 in the nodes on the primary path 20-1 is completed, and each node controls a switch 10 in accordance therewith to open the primary path 20-1.

Next, the node 1-1 sets the routing table 18 for the alternate path 21-1 (S55). The node 1-1 refers to the path table 17 and searches for another alternate path passing the link group (1, 4) like the alternate path 21-1 (S56), but there is no such alternate path (N in S57). Thus, the node 1-1 allocates an unused port to a downstream port of the alternate path 21-1 (S58). That is, the routing table 18 is set as in line 2 of FIG. 11.

Then, the node 1-1 signals to a downstream node 1-4 of the alternate path 21-1 to indicate an upstream port number 1 (S59). The node 1-4 writes the number in its own routing table 18 (N in S60, S61). This signaling also indicates the information on the routes and SRLGs of the primary path 20-1 and alternate path 21-1.

The node 1-4 refers to its own path table 17 and searches for another alternate path passing the link group (4, 6) like the alternate path 21-1 (S56), but there is no such alternate path (N in S57). Thus, the node 1-4 allocates an unused port to a downstream port of the alternate path 21-1 (S58). The node 1-4 records the information on the routes and SRLGs of the primary path 20-1 and alternate path 21-1 in the path table 17.

Then, the node 1-4 signals to a downstream node 1-6 of the alternate path 21-1 to indicate an upstream port number (S59). The node 1-6 writes the number in its own routing table 18 (N in S60, S61). This signaling also indicates the information on the routes and SRLGs of the primary path 20-1 and alternate path 21-1.

The node 1-6 refers to its own path table 17 and searches for another alternate path passing the link group (5, 6) like the alternate path 21-1 (S56), but there is no such alternate path (N in S57). Thus, the node 1-6 allocates an unused port to a downstream port of the alternate path 21-1 (S58). The node 1-6 records the information on the routes and SRLGs of the primary path 20-1 and alternate path 21-1 in the path table 17.

Next, the node 1-6 signals to a downstream node 1-5 of the alternate path 21-1 to indicate an upstream port number (S59). The node 1-5 writes the number in its own routing table 18 (S60). This signaling also indicates the information on the routes and SRLGs of the primary path 20-1 and alternate path 21-1.

The node 1-5 is a destination node of the alternate path 21-1 (Y in S61), and thus allocates the same port as allocated to the primary path 20-1, that is, the port connected to the client, to the downstream port of the alternate path 21-1 (S62). The node 1-5 also records the information on the routes and SRLGs of the primary path 20-1 and alternate path 21-1 in the path table 17.

In this way, setting of the routing tables 18 for the alternate path 21-1 in the nodes on the alternate path 21-1 is completed (S63).

Next, further setting two-way primary path 20-2 and alternate path 21-2 whose source node is the node 1-1 and whose destination node is the node 1-6 will be considered.

The node 1-1 calculates routes of the primary path 20-2 and alternate path 21-2 in the same manner as in the second embodiment, and obtains routes (1, 2), (2, 6) as the routes of the primary path 20-2 and routes (1, 4), (4, 6) as the routes of the alternate path 21-1 (S51). The node 1-1 records information on the routes and SRLGs of the primary path 20-2 and alternate path 21-2 in the path table 17 as shown in FIG. 16 (S52).

Next, the node 1-1 sets the routing table 18 for the primary path 20-2 (S53). The setting manner is the same as in the first embodiment. That is, the routing table 18 is set as in line 3 of FIG. 11.

Then, the node 1-1 signals to a downstream node 1-2 of the primary path 20-2 to indicate an upstream port number 1 (S54). The node 1-2 writes the number in its own routing table 18. This signaling also indicates the information on the routes and SRLGs of the primary path 20-2 and alternate path 21-2, and the node 1-2 records the information in its own path table 17.

Next, the node 1-2 sets the routing table 18 for the primary path 20-2 (S53). The setting manner is the same as in the first embodiment.

Then, the node 1-2 signals to the downstream node 1-6 to indicate an upstream port number. The node 1-6 writes the number in its own routing table 18. This signaling also indicates the information on the routes and SRLGs of the primary path 20-2 and alternate path 21-2, and the node 1-6 records the information in its own path table 17.

Next, the node 1-6 sets the routing table 18 for the primary path 20-2. The setting manner is the same as in the first embodiment.

In this way, setting of the routing tables 18 for the primary path 20-2 in the nodes on the primary path 20-2 is completed, and each node controls a switch 10 in accordance therewith to open the primary path 20-2.

Next, the node 1-1 sets the routing table 18 for the alternate path 21-2 (S55). The node 1-1 refers to the path table 17 (FIG. 16) and searches for another alternate path passing the link group (1, 4) like the alternate path 21-2 (S56). The alternate path 21-1 applies thereto here (Y in S57). The node 1-1 compares the SRLGs of the primary path 20-1 and primary path 20-2 that are recorded in the path table 17 (S68) to find that the SRLGs of both of them do not overlap (N in S69). Thus, the node 1-1 allocates the same port 10 as allocated to the alternate path 21-1, as the downstream port of the alternate path 21-2 (S70). Therefore, the routing table of the node 1-1 is as shown in FIG. 11.

Then, the node 1-1 signals to the downstream node 1-4 of the alternate path 21-2 to indicate an upstream port number 1 (S71). The node 1-4 writes the number in its own routing table 18 (N in S72, S73). This signaling also indicates the information on the routes and SRLGs of the primary path 20-2 and alternate path 21-2, and the node 1-4 records the information in its own path table 17.

The node 1-4 refers to the path table 17 and searches for another alternate path passing a link group (4, 6) like the alternate path 21-2 (S56). The alternate path 21-1 applies thereto here (Y in S57). Thus, the node 1-4 compares the SRLGs of the primary path 20-1 and primary path 20-2 that are recorded in the path table 17 (S68) to find that the SRLGs of both of them do not overlap (N in S69). Therefore, the node 1-4 allocates the same port as allocated to the alternate path 21-1, as the downstream port of the alternate path 21-2 (S70).

Next, the node 1-4 signals to the downstream node 1-6 of the alternate path 21-2 to indicate an upstream port number (S71). The node 1-6 writes the number in its own routing table 18 (S72). This signaling indicates the information on the routes and SRLGs of the primary path 20-2 and alternate path 21-2.

The node 1-6 is a destination node of the alternate path 21-2 (Y in S73), and thus allocates the same port as allocated to the primary path 20-2, that is, the port connected to the client, to the downstream port of the alternate path 21-2 (S74). The node 1-6 also records the information on the routes and SRLGs of the primary path 20-2 and alternate path 21-2 in the path table 17. In this way, setting of the routing tables 18 for the alternate path 21-2 in the nodes on the alternate path 21-2 is completed (S75). The alternate paths 21-1 and 21-2 share links on the link groups (1, 4), (4, 6).

When the SRLGs of the primary path 20-1 and primary path 20-2 overlaps at step 69 (Y in S69), the node 1-4 allocates a port different from that allocated to the alternate path 21-1, as the downstream port of the alternate path 21-2 (S76).

As described above, two pairs of primary paths and alternate paths respectively having no overlapping SRLG can be set, and two alternate paths can be set to share a link on a certain link group.

Next, a fourth embodiment will be described. In the fourth embodiment, configurations of a network, nodes, and a management center are the same as in the first embodiment, and calculation steps only of routes of a primary path and an alternate path are different.

Figure 32:
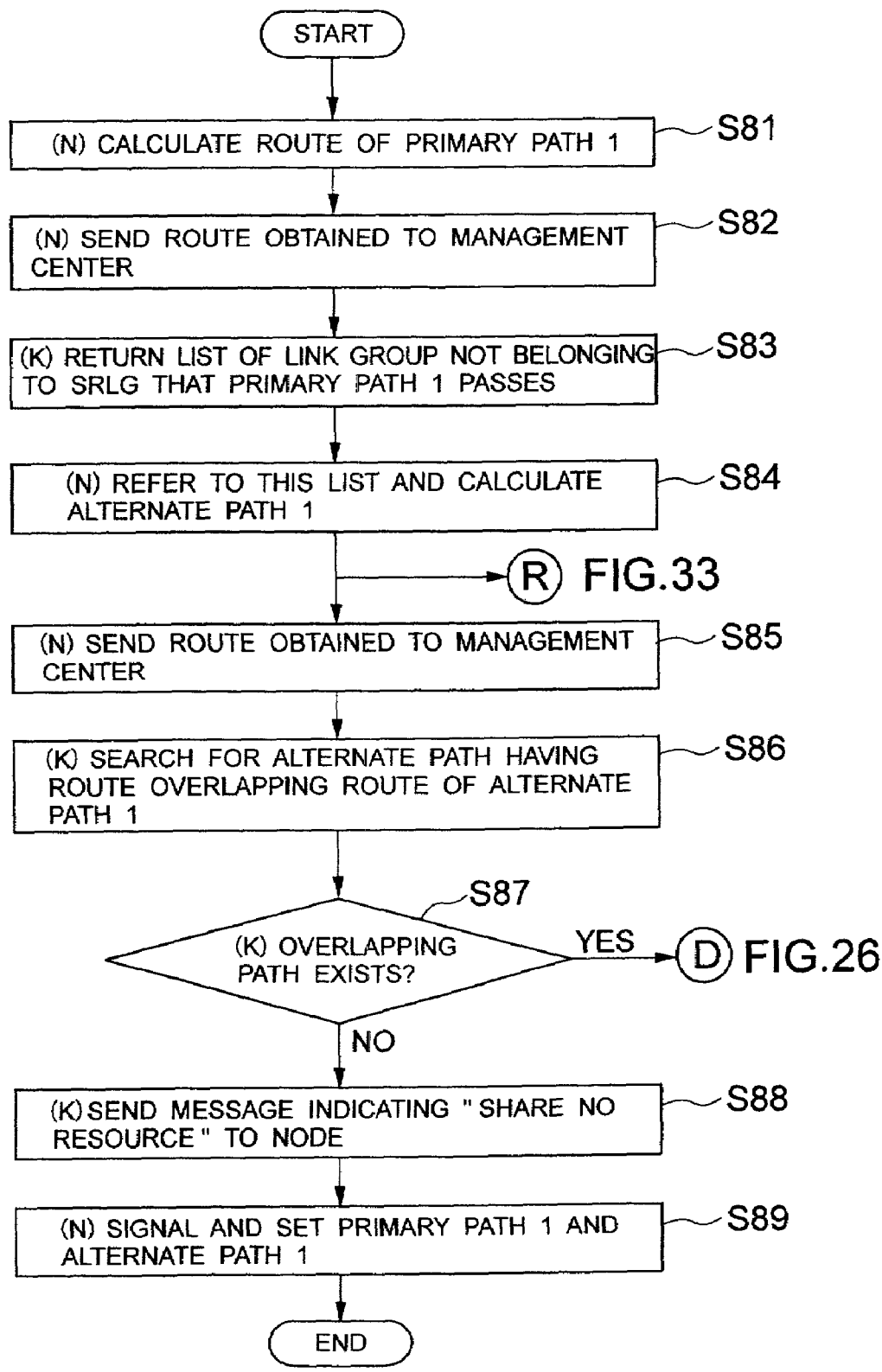
FIG. 32 is a flowchart showing operation of a fourth embodiment of the invention.

Now, operation of the fourth embodiment will be described with reference to the flowchart. FIG. 32 is a flowchart showing the operation of the fourth embodiment. A node control unit 11 of a node 1-1 first calculates a route of a primary path 20-1 in the same manner as in the first embodiment (S81). Then, the node 1-1 sends the route obtained of the primary path 20-1 to a management center 2 (S82). A centralized control unit 15 of the management center 2 records the route in a path table 17. Next, the centralized control unit 15 refers to a SRLG table 16 to prepare a list of a link group not belonging to SRLG that the route of the primary path 20-1 sent from the node 1-1 passes, and returns the list to the node 1-1 (S83). Here, a list of link groups (1, 2), (1, 4), (2, 6), (4, 6), (5, 6) is sent. The node 1-1 calculates the shortest route from the node 1-1 to node 1-5 simply using link groups having one or more available links among link groups included in the list (S84). This provides the routes (1, 4), (4, 6), (5, 6) to be the routes of the alternate path 21-1.

The node 1-1 sends the routes of the alternate path 21-1 to the management center 2 (S85). The management center 2 searches for an alternate path having a route overlapping the route of the alternate path 21-1 in the path table 17 (S86), but there is no such alternate path at this time (N in S87). Thus, the management center 2 sends a message indicating "share no resource" to the node 1-1 (S88), and records the routes of the alternate path 21-1 in the path table 17. A state of the path table 17 at this time is as shown in FIG. 6.

Subsequently, the node 1-1 signals to the nodes on the primary path 20-1 and alternate path 21-1 as in the first embodiment, and sets the primary path 20-1 and alternate path 21-1 (S89).

Next, further setting two-way primary path 20-2 and alternate path 21-2 whose source node is the node 1-1 and whose destination node is the node 1-6 in this network will be considered.

The node 1-1 calculates a route of a primary path 20-2 also in the same manner as in the first embodiment (S81). The node 1-1 sends the route to the management center 2 (S82). The centralized control unit 15 of the management center 2 records the route in the path table 17. Next, the centralized control unit 15 refers to the SRLG table 16 to prepare a list of a link group not belonging to SRLG that the route of the primary path 20-2 sent from the node 1-1 passes, and returns the list to the node 1-1 (S83). Here, a list of link groups (1, 3), (1, 4), (3, 5), (4, 5), (4, 6), (5, 6) is sent. The node 1-1 calculates the shortest route from the node 1-1 to node 1-5 simply using link groups having one or more available links among link groups included in the list (S84). This provides the routes (1, 4), (4, 6) to be the routes of the alternate path 21-2.

The node 1-1 sends the routes of the alternate path 21-2 to the management center 2 (S85), and the centralized control unit 15 of the management center 2 records the routes in the path table 17.

Then, the management center 2 searches for an alternate path having a route overlapping the route of the alternate path 21-2 in the path table 17 (S86), and determines whether a resource of the alternate path can be shared based on SRLG of a corresponding primary path (S87). Operation thereafter is completely the same as in the first embodiment. As described above, two pairs of primary paths and alternate paths respectively having no overlapping SRLG can be set, and two alternate paths can be set to share a link on a certain link group.

Next, a fifth embodiment will be described. In the fifth embodiment, configurations of a network and nodes are the same as in the first embodiment, and a configuration of a management center is different. The fifth embodiment is also similar to the fourth embodiment in that calculation results of routes of a primary path are sent to the management center before routes of an alternate path are calculated.

Figure 17:
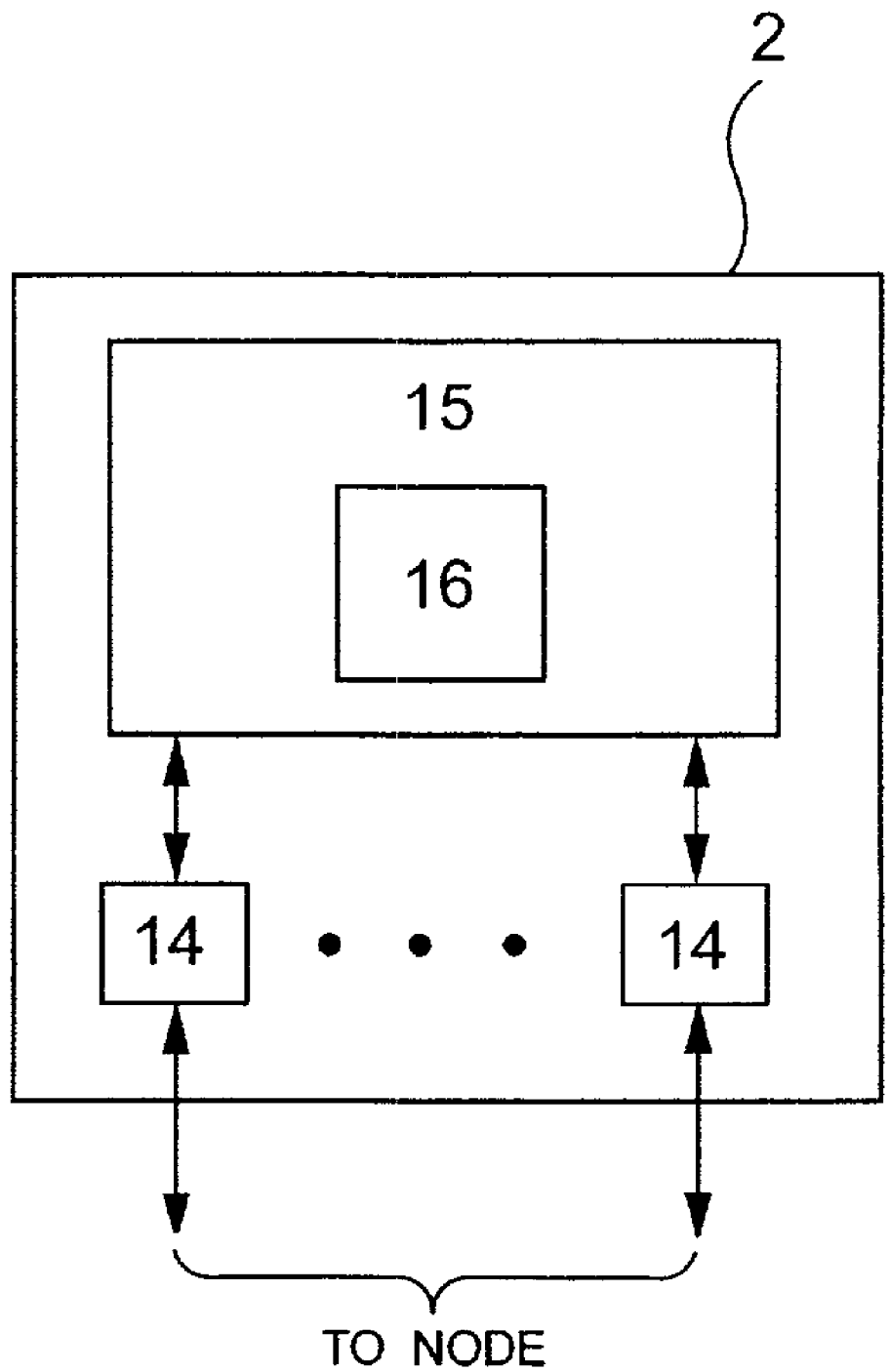
FIG. 17 shows a configuration of a management center 2.

The management center 2 in this embodiment includes an SRLG table 16 as shown in FIG. 17, but includes no path table 17. In this embodiment, setting manner of a primary path 20-1 and alternate path 21-1 will be described.

Figure 33:
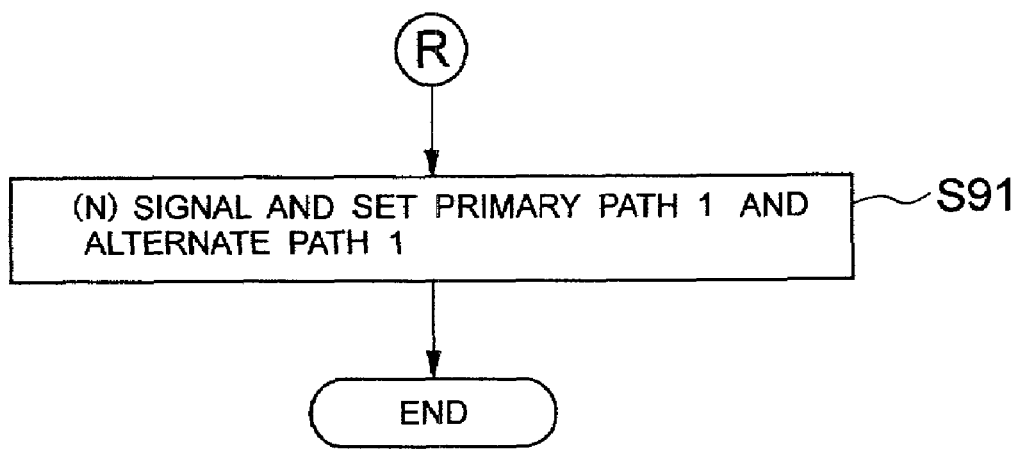
FIG. 33 is a flowchart showing operation of a fifth embodiment of the invention.

Now, operation of the fifth embodiment will be described with reference to the flowchart. FIG. 33 is a flowchart showing the operation of the fifth embodiment. A node control unit 11 of a node 1-1 first calculates a route of a primary path 20-1 in the same manner as in the fourth embodiment (S81 in FIG. 32). Then, the node 1-1 sends the route obtained of the primary path 20-1 to a management center 2 (S82). A centralized control unit 15 of the management center 2 refers to a SRLG table 16 to prepare a list of a link group not belonging to SRLG that the route of the primary path 20-1 sent from the node 1-1 passes, and returns the list to the node 1-1 (S83). Here, a list of link groups (1, 2), (1, 4), (2, 6), (4, 6), (5, 6) is sent. The node 1-1 calculates the shortest route from the node 1-1 to node 1-5 simply using link groups having one or more available links among link groups included in the list (S84). This provides the routes (1, 4), (4, 6), (5, 6) to be the route of the alternate path 21-1.

Subsequently, the node 1-1 signals to the nodes on the primary path 20-1 and alternate path 21-1 as in the first embodiment, and sets the primary path 20-1 and alternate path 21-1 (S91 in FIG. 33).

In this way, a pair of primary path and alternate path having no overlapping SRLG can be set.

Next, a sixth embodiment will be described. In the sixth embodiment, configurations of a network and nodes are the same as in the first embodiment, and a configuration of a management center is different. A management center 2 in this embodiment includes a path table 17 as shown in FIG. 13, but includes no SRLG table 16.

Figure 34:
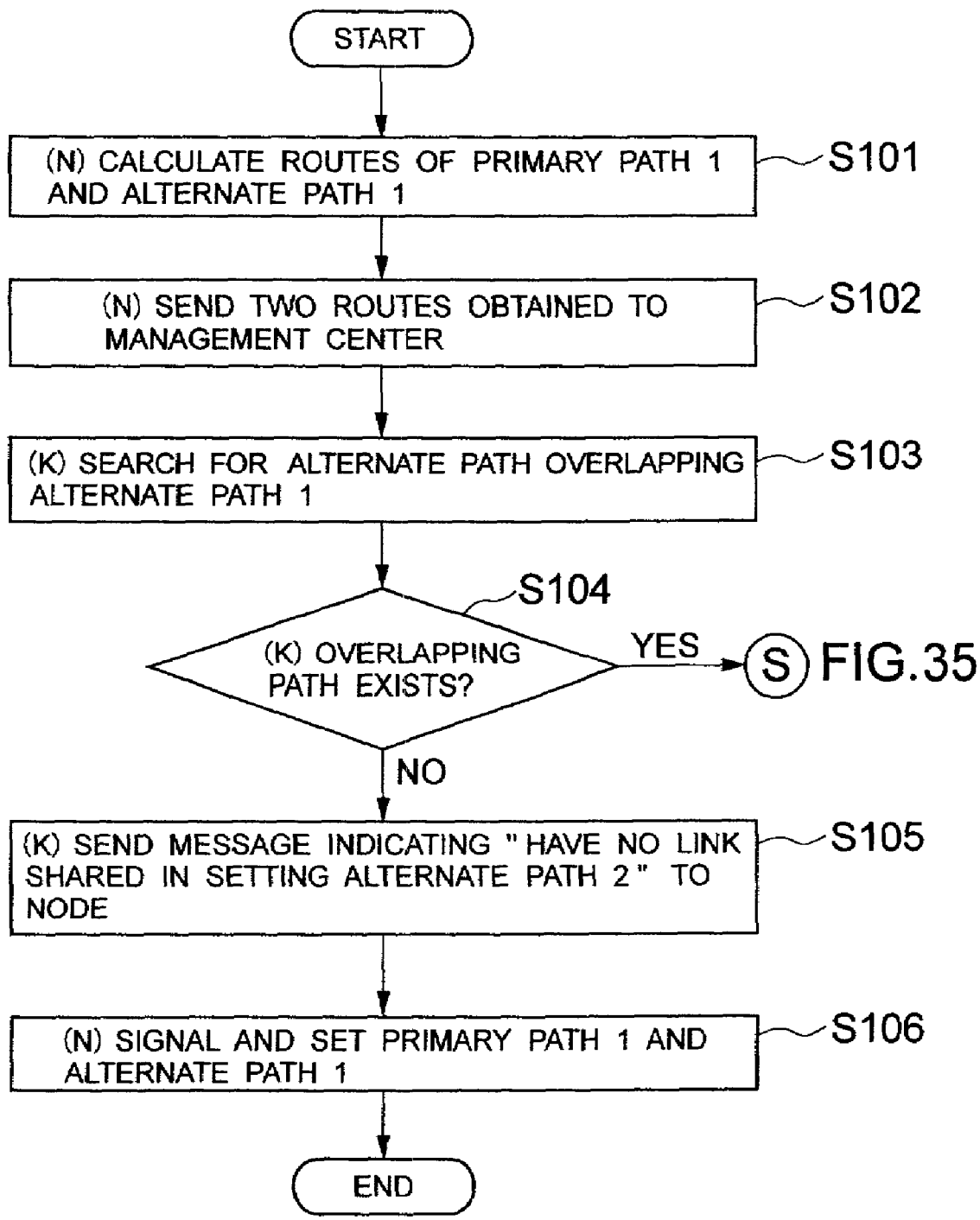
FIG. 34 is a flowchart showing operation of a sixth embodiment of the invention.
Figure 35:
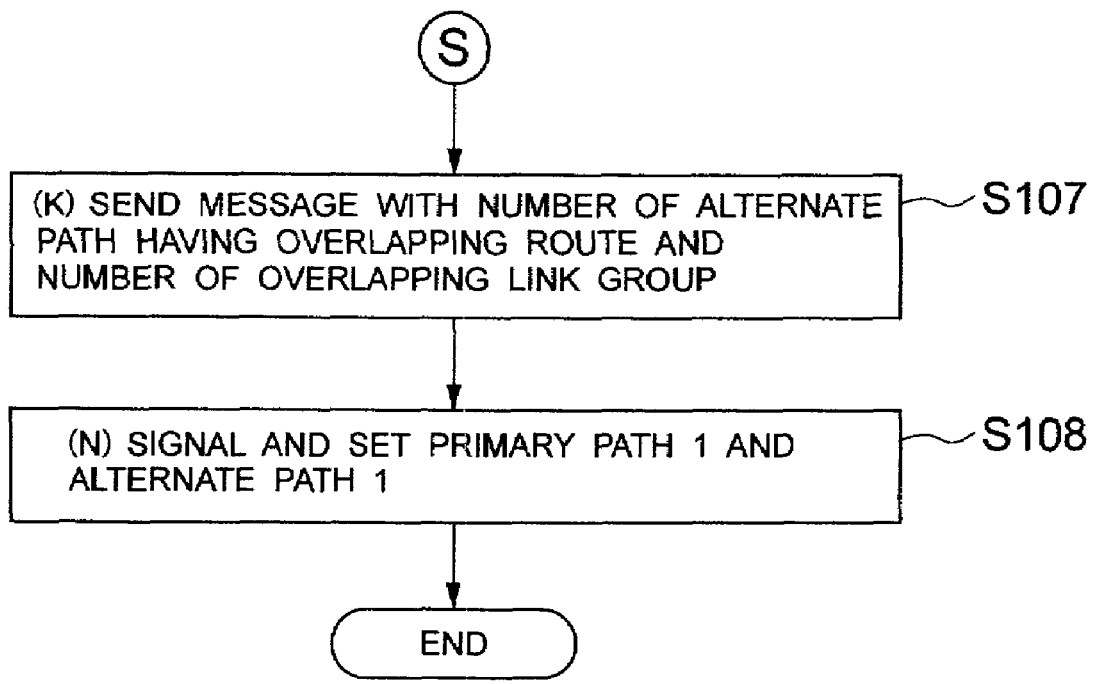
FIG. 35 is a flowchart showing operation of the sixth embodiment of the invention.

Now, operation of the sixth embodiment will be described with reference to the flowcharts. FIGS. 34 and 35 are flowcharts showing the operation of the sixth embodiment. A node control unit 11 of a node 1-1 first calculates a route of a primary path 20-1 in the same manner as in the first embodiment. This provides the routes (1, 3), (3, 5) of the primary path 20-1.

The node 1-1 calculates the shortest route from the node 1-1 to node 1-5 that simply passes link groups having one or more available links except the link groups (1, 3), (3, 5). This calculation provides the routes (1, 4), (4, 5) to be the routes of the alternate path 21-1 (S101).

Then, the node 1-1 sends the routes of the obtained primary path 20-1 and alternate path 21-1 to the management center 2 (S102). The management center 2 searches for an alternate path having a route overlapping the route of the alternate path 21-1 in the path table 17 (S103), but there is no such alternate path at this time (N in S104). Thus, the management center 2 sends a message indicating "have no link shared in setting the alternate path 21-2" to the node 1-1 (S105), and records the routes of the primary path 20-1 and alternate path 21-1 in the path table 17.

Subsequently, the node 1-1 signals to the nodes on the primary path 20-1 and alternate path 21-1 as in the first embodiment, and sets the primary path 20-1 and alternate path 21-1 (S106).

Next, further setting two-way primary path 20-2 and alternate path 21-2 whose source node is the node 1-1 and whose destination node is the node 1-6 in this network will be considered.

The node 1-1 calculates a route of a primary path 20-2 also in the same manner as in the first embodiment (S81). This provides the routes (1, 2), (2, 6) of the primary path 20-2.

Then, the node 1-1 calculates the shortest route from the node 1-1 to node 1-6 that simply passes link groups having one or more available links except the link groups (1, 2), (2, 6). This calculation provides the routes (1, 4), (4, 6) to be the routes of the alternate path 21-2 (S101).

Next, the node 1-1 sends the routes of the obtained primary path 20-2 and alternate path 21-2 to the management center 2 (S102). The management center 2 searches for an alternate path having a route overlapping the route of the alternate path 21-2 in the path table 17 (S103). The alternate path 21-1 overlaps the alternate path 21-2 in the link group (1, 4) (Y in S104). Thus, the management center 2 sends a message indicating "have the link shared with the alternate paths 21-1 in the link group (1, 4) in setting the alternate path 21-2" to the node 1-1 (S107), and records the route of the primary path 20-2 and alternate path 21-2 in the path table 17.

Subsequently, the node 1-1 signals to the nodes on the primary path 20-2 and alternate path 21-2 as in the first embodiment, and sets the primary path 20-2 and alternate path 21-2 (S108).

As described above, two pairs of primary paths and alternate paths respectively sharing no link can be set, and two alternate paths can be set to share a link on a certain link group.

Figure 18:
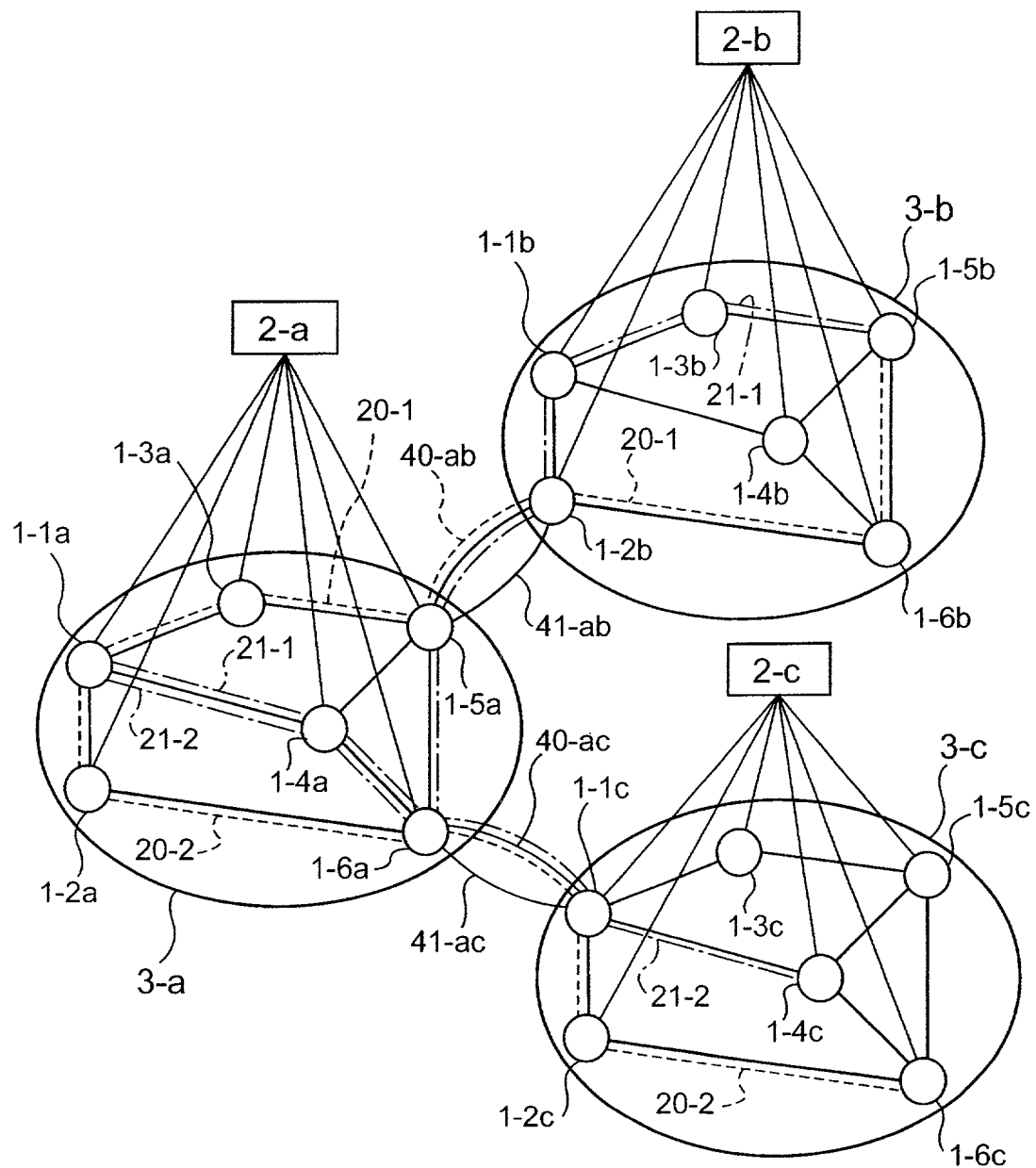
FIG. 18 shows a configuration of a network according to a seventh embodiment of the invention.

Next, a seventh embodiment will be described. A configuration of a network of the seventh embodiment is shown in FIG. 18. In this embodiment, the network consists of three subnetworks 3-a, 3-b, 3-c. A configuration of each subnetwork is the same as that of the network in the first embodiment. A node 1-5 of the subnetwork 3-a and a node 1-2b of the subnetwork 3-b are connected by a primary link group 40-ab and an alternate link group 41-ab respectively consisting of four links. Using the two link groups, failure recovery by an Automatic Protection Switching (APS) scheme is performed between the nodes 1-5a and 1-2b. The APS scheme is described in T. Wu, "Fiber Network Service Survivability," Artech House, 1992, Chapter 3 and so on. Likewise, failure recovery by the APS scheme using a primary link group 40-ac and alternate link group 41-ac is performed between the subnetworks 3-a and 3-c.

A configuration of a node 1 in this embodiment is shown in FIG. 19. The configuration is the same as that of the node 1 in the first embodiment except for presence of an external routing table 60 in a node control unit 11. A topology table 12 of the node 1 in the subnetwork 3-*a* holds topology information in the subnetwork 3-*a*, that is, the contents of FIGS. 4 and 21. The external routing table 60 shows a node that a route passes when a path to a destination node in another subnetwork is set, that is, a boundary node. An example of the external routing table 60 is shown in FIG. 20. FIG. 20 shows that the node 1-5*a* is a boundary node when a path whose destination is the subnetwork 3-*b* is set, and that the node 1-6*a* is a boundary node when a path whose destination is the subnetwork 3-*c*. A configuration of a management center 2 of this embodiment is the same as that of the management center 2 in the first embodiment. An SRLG table 16 in the management center 2 of the subnetwork 3-*a* holds SRLG information in the subnetwork 3-*a*, that is, the same contents as FIG. 5. In a path table 17, routes and SRLGs of the paths in the subnetwork 3-*a* are recorded.

Figure 36:
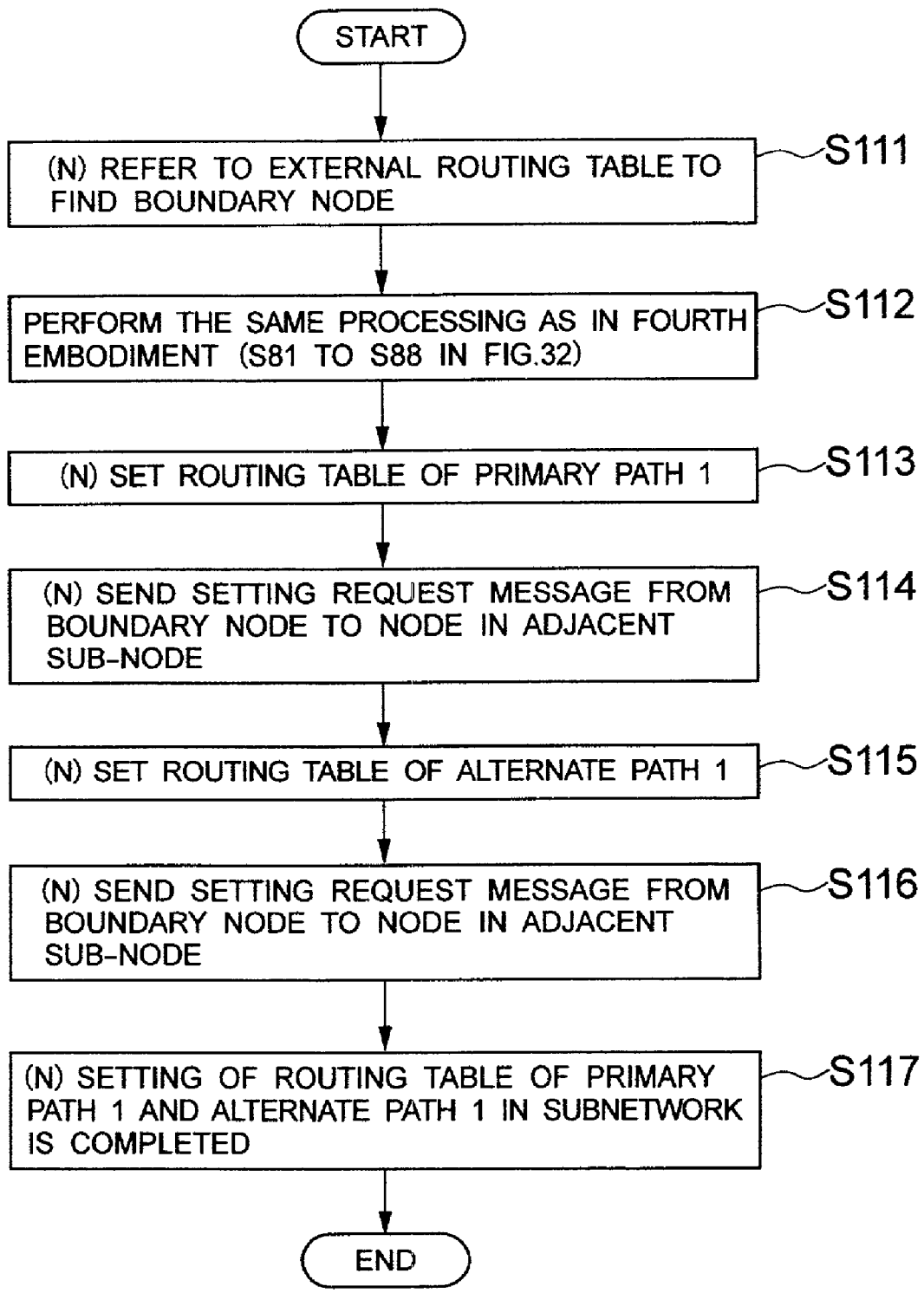
FIG. 36 is a flowchart showing operation of the seventh embodiment of the invention.
Figure 37:
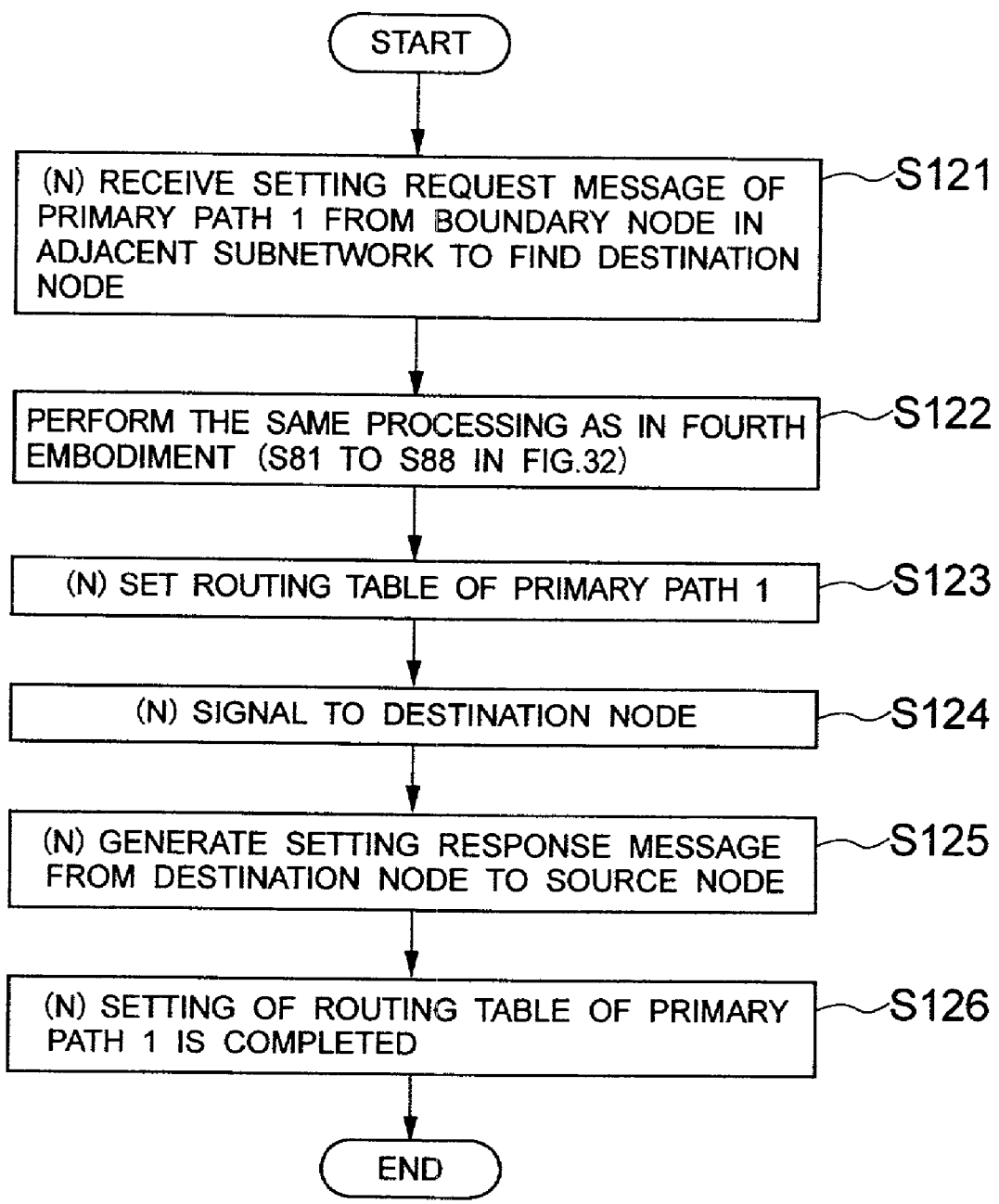
FIG. 37 is a flowchart showing operation of the seventh embodiment of the invention.
Figure 38:
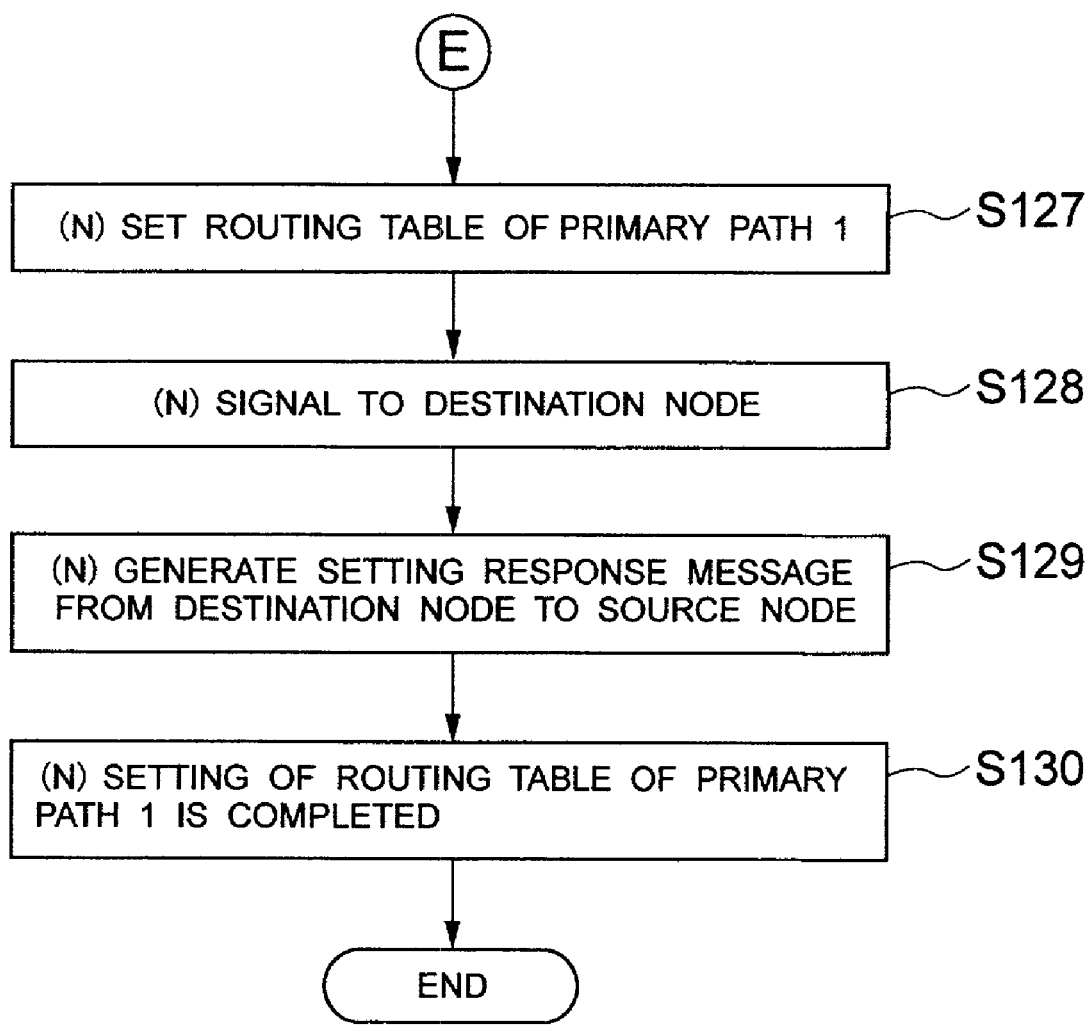
FIG. 38 is a flowchart showing operation of the seventh embodiment of the invention.

Now, operation of the seventh embodiment will be described with reference to the flowcharts. FIGS. 36 and 37 are flowcharts showing the operation of the seventh embodiment.

Setting a primary path 20-1 and alternate path 21-1 whose source is the node 1-1*a* in the subnetwork 3-*a* and whose destination is the node 1-5*b* in the subnetwork 3-*b* will be considered.

A node control unit 11 of the node 1-1*a* first refers to the external routing table 60 to find that the route may pass the node 1-5*a* when the path whose destination is the node in the subnetwork 3-*b* (S111) is set. The node control unit 11 of the node 1-1*a* refers to the topology table 12 to calculate the shortest route from the node 1-1*a* to node 1-5*a* that simply passes link groups having one or more available links, using the CSPF algorithm. This provides the routes (1, 3), (3, 5) of the primary path 20-1 (S81 in FIG. 32).

Then, the node 1-1*a* sends the routes obtained (1, 3), (3, 5) of the primary path 20-1 to the management center 2-*a* (S82). A centralized control unit 15 of the management center 2-*a* records the routes in the path table 17. Next, the centralized control unit 15 refers to the SRLG table 16 to prepare a list of a link group not belonging to SRLG that the routes of the primary path 20-1 sent from the node 1-1*a* pass, and returns the list to the node 1-1*a* (S83). Here, a list of link groups (1, 2), (1, 4), (2, 6), (4, 6), (5, 6) is sent. The node 1-1*a* calculates the shortest route from the node 1-1*a* to node 1-5*a* simply using link groups having one or more available links among link groups included in the list (S84). This provides the routes (1, 4), (4, 6), (5, 6) to be the routes of the alternate path 21-1.

The node 1-1*a* also sends the routes of the alternate path 21-1 to the management center 2-*a* (S85). The management center 2-*a* searches for an alternate path having a route overlapping the route of the alternate path 21-1 in the path table 17 (S86), but there is no such alternate path at this time (N in S87). Thus, the management center 2-*a* sends a message indicating "share no resource" to the node 1-1*a* (S88), and records the routes of the alternate path 21-1 in the path table 17. A state of the path table 17 at this time is shown in FIG. 6.

Then, the node 1-1*a* refers to a port table 19 to set the routing table 18 for the primary path 20-1 (S113 in FIG. 36). The node 1-1*a* is the source node of the primary path 20-1, and thus an upstream node is a client. Among ports connected to the client, the port 0 having the smallest number is selected as an upstream port. A downstream node of the primary path 20-1 is the node 1-3*a*, and a port 6 having the smallest number is selected from unused ports connected to the node 1-3 as a downstream port. Thus, the routing table 18 of the node 1-1*a* for the primary path 20-1 is set as in line 1 of FIG. 8.

Then, the node 1-1*a* sends a setting request message of the primary path 20-1 that is a kind of signaling messages to the node 1-3*a* via a control channel 31. The setting request message includes information such as identification data of the message, identification data indicating that this path is the primary path, path number, source node number, destination node number, route information to the node 1-5*a*, and upstream port number of the downstream node. The upstream port number of the downstream node is a port of the node 1-3*a* connected to a downstream port 6 allocated to the primary path 20-1 by the node 1-1*a*, that is, a port 1.

The node 1-3*a* having received the setting request message writes the upstream node of the primary path 20-1 being the node 1-1*a* and the upstream port being the port 1 in the routing table 18. Next, the node 1-3*a* selects a downstream port to be connected to the downstream node 1-5*a* in the same manner as the node 1-1*a* does, and writes it in the routing table 18. The routing table of the node 1-3*a* for the 20-1 is now completed. Further, the node 1-3*a* rewrites the upstream port number of the downstream node in the setting request message, and sends the setting request message to the node 1-5*a*.

The node 1-5*a* can find the upstream node (node 1-3*a*) and the upstream port number for the primary path 20-1 by the setting request message, and thus writes them in its own routing table 18. The node 1-5*a* has known that the node 1-5*a* itself is the boundary node for the path to the subnetwork 3-*b*. In the setting request message of the primary path 20-1 received by the node 1-5*a*, it is also written that the destination of the path is the node 1-5*b* in the subnetwork 3-*b*, so that the node 1-5*a* writes the node 1-2*b* in the routing table 18 as a downstream node number for the primary path 20-1, and selects the port having the smallest port number from the ports connected to the link included in the link group 40-*ab* as the downstream port, and also writes it in the routing table 18. Then, the node 1-5*a* rewrites the upstream port number of the downstream node in the setting request message into the port number of the node 1-2*b* connected to the downstream port selected by the node 1-5*a* itself, and sends the setting request message to the node 1-2*b* (S114).

Next, the node 1-1*a* sets the routing table 18 for the alternate path 21-1 as in line 2 of FIG. 8 (S115). The node 1-1*a* is the source of the alternate path 21-1, so that the upstream node and upstream port are identical to those of the primary path 20-1, the downstream node is a node 1-4*a*, and a port 10 having the smallest port number is selected from the ports connected to the node 1-4*a* as the downstream port.

Subsequently, the node 1-1*a* generates a setting request message of the alternate path 21-1 and sends it to the node 1-4*a* via the control channel 31. The setting request message includes information such as identification data of the message, identification data indicating that this path is the alternate path, path number, source node number, destination node number, route information to the node 1-5*a*, upstream port number of the downstream port, and identification data indicating that this path shares no resource with another alternate path. The upstream port number of the downstream node is set to 10 that is the port number of the node 1-4*a* connected to the port 10 of the node itself.

The node 1-4*a* having received this message writes the upstream port number 10 for the alternate path 21-1 in the routing table 18, selects the downstream port and write it in the routing table 18, and then rewrites the upstream port number of the downstream node in the setting request message and send it to a node 1-6*a*.

The node 1-6*a* similarly sets the routing table, and then transfers the setting request message to the node 1-5*a*.

The node 1-5*a* having received the setting request message of the alternate path 21-1 first writes the received upstream port number in the routing table 18. The node 1-5*a* selects the downstream node number and downstream port number as in the primary path 20-1, and writes them in the routing table 18. Then, the node 1-5a rewrites the upstream port number of the downstream node of the setting request message and sends it to the node 1-2b that is the downstream node (S116).

In this way, setting of the routing table 18 for the primary path 20-1 and alternate path 21-1 in the subnetwork 3-a is completed (S117).

On the other hand, the topology table 12 in the subnetwork 3-b stores topology information in the subnetwork 3-b, the contents of FIG. 4, and information that the node 1-2b is connected to the node 1-5a of the subnetwork 3-a. The SRLG table 16 in the management center 2 of the subnetwork 3-b holds SRLG information in the subnetwork 3-b, that is, the same contents as FIG. 5. In the path table 17, routes and SRLGs of the path in the subnetwork 3-b are recorded.

In the subnetwork 3-b, the node 1-2b first receives the setting request message of the primary path 20-1 from the node 1-5a (S12) (S121 in FIG. 37). This message indicates that the destination node of this path is the node 1-5b in the same subnetwork, but does not indicate the route thereto. Thus, the node 1-2b refers to its own topology table 12 to calculate the shortest route from the node 1-2b to node 1-5b that simply passes link groups having one or more available links, using the CSPF algorithm (S81 in FIG. 32). This provides the routes (2, 6), (5, 6) to be the routes of the primary path 20-1. Then, the node 1-2b sends the routes obtained to a management center 2-b (S82). A centralized control unit 15 of the management center 2-b records the routes in the path table 17. Next, the centralized control unit 15 refers to the SRLG table 16 to prepare a list of a link group not belonging to SRLG that the routes of the primary path 20-1 sent from the node 1-2b pass, and returns the list to the node 1-2b (S83). Here, a list of link groups (1, 2), (1, 3), (1, 4), (3, 5), (4, 5), (4, 6) is sent. Then, the node 1-2b calculates the shortest route from the node 1-2b to node 1-5b simply using link groups having one or more available links among link groups included in the list (S84). This provides the routes (1, 2), (1, 3), (3, 5) to be the routes of the alternate path 21-1.

The node 1-2b also sends the routes of the alternate path 21-1 to the management center 2-b (S85). The management center 2-b searches for an alternate path having a route overlapping the route of the alternate path 21-1 in the path table 17, but there is no such alternate path at this time (N in S87). Thus, the management center 2-b sends a message indicating "share no resource" to the node 1-2b (S88), and records the routes of the alternate path 21-1 in the path table 17.

Subsequently, the node 1-2b sets the routing table 18 for the primary path 20-1 (S123 in FIG. 37), and then writes the route from the node 1-2b to the node 1-5b in the setting request message, and send it to the node 1-6b that is the downstream node. The node 1-6b also sets the routing table 18, and then rewrites the setting request message and sent it to the node 1-5b. In these nodes, setting of the routing table 18 and signaling of the setting request message are performed in completely the same manner as performed for the primary path 20-1 in the subnetwork 3-a.

Finally, the node 1-5b having received the setting request message sets the upstream port of the routing table 18 as specified by the node 1-6b (S124). The node 1-5b is the destination node of the primary path 20-1, so that the downstream node is the client, and the port having the smallest port number is selected from the ports connected to the client as the downstream port. The node 1-5b also writes this information in the routing table 18. The node 1-5b changes a switch 10 in accordance with the contents of the routing table 18, and then generates a setting response message that is a kind of signaling messages and sends it to the node 1-6b. The setting response message includes information such as identification data of the message, identification data indicating that this path is the primary path, path number, source node number, and destination node number. The setting response message is transferred in a direction opposite the path on the route of the primary path 20-1 to the node 1-1a that is the source node (S125). Each node on the route receives the setting response message to change its own switch 10 in accordance with the contents of the routing table 18. In this way, setting of the primary path 20-1 is completed (S126).

Then, the node 1-2b sets the routing table 18 for the alternate path 21-1 (S127), writes the route information of the alternate path 21-1 in the subnetwork 3-b in the setting request message, and sends it to the node 1-1b. The setting request message is transferred from the node 1-1b to the node 1-3b and node 1-5b, and the routing table 18 is set in each node on the way (S128). The source is not shared with another alternate path, and setting of the routing table 18 and signaling of the setting request message are performed in completely the same manner as performed for the alternate path 21-1 in the subnetwork 3-a.

In the node 1-5b, the same port as allocated to the primary path 20-1 is allocated as the downstream port for the alternate path 21-1. When setting of the routing table 18 is completed, the node 1-5b generates the setting response message. This message is transferred in a direction opposite the path on the route of the alternate path 21-1 to the node 1-1a that is the source node (S129). Each node on the route does not change the switch 10 when it receives the setting response message to the alternate path. In this way, setting of the alternate path 21-1 is completed (S130).

Next, setting a primary path 20-2 and alternate path 21-2 whose source is the node 1-1a in the subnetwork 3-a and whose destination is a node 1-6c in a subnetwork 3-c will be considered.

The node control unit 11 in the node 1-1a first refers to the external routing table 60 to find that the route may pass the node 1-6a when the path whose destination is the node in the subnetwork 3-c (S111 in FIG. 36) is set. The node control unit 11 of the node 1-1a calculates the shortest route from the node 1-1a to node 1-6a that simply passes link groups having one or more available links (S81 in FIG. 32). This provides the routes (1, 2), (2, 6) of the primary path 20-2.

Then, the node 1-1a sends the routes obtained of primary path 20-1 to the management center 2-a (S82). The centralized control unit 15 of the management center 2-a records the routes in the path table 17. Next, the centralized control unit 15 refers to the SRLG table 16 to prepare a list of a link group not belonging to SRLG that the routes of the primary path 20-2 sent from the node 1-1a pass, and returns the list to the node 1-1a (S83). Here, a list of link groups (1, 3), (1, 4), (3, 5), (4, 5), (4, 6), (5, 6) is sent. The node 1-1a calculates the shortest route from the node 1-1a to node 1-6a simply using link groups having one or more available links among link groups included in the list (S84). This provides the routes (1, 4), (4, 6) to be paths of the alternate path 21-2.

The node 1-1a also sends the routes of the alternate path 21-2 to the management center 2-a (S85). The centralized control unit 15 of the management center 2 searches for an alternate path having a route overlapping the route of the alternate path 21-2 in the path table 17 (S86). The alternate path 21-1 overlaps the alternate path 21-2 in the link groups (1, 4), (4, 6) (Y in S87) here. Thus, the centralized control unit 15 checks the SRLGs that the routes of the primary path 20-1 and primary path 20-2 corresponding to the alternate paths pass (S17 in FIG. 26). The SRLGs of both primary paths do not overlap (N in S18), so that the centralized control unit 15 sends a message indicating "share the link with the alternate path 21-1 in the link groups (1, 4), (4, 6)" to the node 1-1a, and records the routes of the alternate path 21-2 in the path table 17 (S19).

Subsequently, the node 1-1a sets the routing table 18 for the primary path 20-2 (S20, S21), and then generates the setting request message. The setting request message is transferred to the node 1-6a via the node 1-4a (S22). In accordance therewith, the routing tables for the 20-2 are also set in the node 1-4a and node 1-6a. The node 1-6a is the boundary node, so that the node 1-1c is set as the downstream node, and the port connected to the primary link group 40-ac is set as the downstream port in the routing table 18. Then, the node 1-6a transfers the setting request message to the node 1-1c. A series of steps as described above is performed in completely the same manner as performed in the subnetwork 3-a for the primary path 20-1.

Next, the node 1-1a sets the routing table 18 for the 21-2 (S23). The node 1-1a selects the same port as allocated to the 21-1, as the downstream port. Then, the node 1-1a generates the setting response message to the alternate path 21-2 (S24). The setting request message includes information such as identification data of the message, identification data indicating that this path is the alternate path, path number, source node number, destination node number, route information to the node 1-6a, and upstream port number of the downstream port, and also information that this path shares the link with the alternate path 21-1 in the link groups (1, 4), (4, 6).

The node 1-4a having received the setting request message selects the same port as allocated to the alternate path 21-1, as the downstream port for the alternate path 21-2. Further, the node 1-4a writes the port number of the node 1-6a connected to the downstream port in the setting request message, and transfers it to the node 1-6a.

The node 1-6a writes the port indicated from the node 1-4a by the setting request message in the routing table 18 as the upstream port. The node 1-6a is the boundary node, so that the same downstream node and downstream port as set for the primary path 20-2 are set. Then, the node 1-6a transfers the setting request message to the node 1-1c (S113 to S117 in FIG. 36).

In this way, setting of the routing table 18 for the primary path 20-2 and alternate path 21-2 in the subnetwork 3-a is completed.

Then, setting for the primary path 20-2 and alternate path 21-2 in the subnetwork 3-c is performed.

First, the node 1-1c having received the setting request message to the primary path 20-2 from the node 1-6a (S121 in FIG. 37) calculates the route of the primary path 20-2 from the node 1-1c to node 1-6c (S81 in FIG. 32) and send the route to a management center 2-c (S82). A centralized control unit 15 of the management center 2-c records the route in the path table 17 to prepare a list of a link group not belonging to SRLG that the route of the primary path 20-2 sent from the node 1-1c pass, and returns the list to the node 1-1c (S83). Then, the node 1-1c calculates the route of the alternate path 21-2 from the node 1-1c to node 1-6c simply using the link groups included in this list (S84). Here, the contents of the SRLG table or path table in the management center 2-c are the same as in the management center 2-a, so that a calculation method of the routes of the primary path 20-2 and alternate path 21-2 in the subnetwork 3-c and the obtained results are identical to those of the routes of the primary path 20-2 and alternate path 21-2 in the subnetwork 3-a.

The node 1-1c also sends the routes of the alternate path 21-2 to the management center 2-c (S85). The management center 2-c searches for an alternate path having a route overlapping the route of the alternate path 21-2 in the path table 17, but there is no such alternate path at this time (N in S87). Thus, the management center 2-c sends a message indicating "share no resource" to the node 1-1c, and records the route of the alternate path 21-2 in the path table 17 (S88).

Subsequently, the node 1-1c sets the routing table 18 for the primary path 20-2 (S123 in FIG. 37), and then writes the route of the primary path 20-2 in the subnetwork 3-c in the setting request message, and sends it to the node 1-2c. The setting request message is transferred from the node 1-2c to the node 1-6c (S124). In accordance therewith, the routing tables 18 for the 20-2 are also set in the node 1-2c and node 1-6c. The node 1-6c is the destination node, so that the client is selected as the downstream node, and the port having the smallest port number is selected from unused ports connected to the client as the downstream port, and these are set in the routing table 18. Then, the node 1-6c generates the setting response message and send it to the node 1-2c. The setting response message is transferred in a direction opposite the path on the primary path 20-2 to the node 1-1a that is the source node (S125). In accordance therewith, each node on the route changes the switch 10 (S126).

Then, the node 1-1c sets the routing table 18 for the alternate path 21-2 (S127), and then writes the route of the alternate path 21-2 in the subnetwork 3-c in the setting request message, and sends it to the node 1-4c. The setting request message is transferred from the node 1-4c to the node 1-6c (S128). In accordance therewith, the routing tables 18 for the alternate path 21-2 are also set in the node 1-4c and node 1-6c, but the link is not shared with another alternate path. The node 1-6c is the destination node, so that the client is selected as the downstream node, and the port having the smallest port number is selected from unused ports connected to the client as the downstream port, and these are set in the routing table 18. Then, the node 1-6c generates the setting response message and send it to the node 1-4c. The setting response message is transferred in a direction opposite the path on the alternate path 21-2 to the node 1-1a that is the source node (S129). Each node on the path do not change the switch 10 when it receives the setting response message to the alternate path. In this way, setting of the primary path 20-2 and alternate path 21-2 is completed (S130).

According to this embodiment, two pairs of path, that is, the primary path 20-1 and alternate path 21-1, and the primary path 20-2 and alternate path 21-2 can be set so as not to share the SRLG in each subnetwork 3. Thus, even if failure occurs in the link or node on the primary path 20-1 or primary path 20-2 in each subnetwork 3, the failure can be recovered by switching to the alternate path. At the boundary of each subnetwork 3, failure recovery is also performed by APS. Further, in the subnetwork 3-a, the alternate path 21-1 and alternate path 21-2 share the link on the link groups (1, 4), (4, 6), thereby allowing savings in alternate sources.

Figure 22:
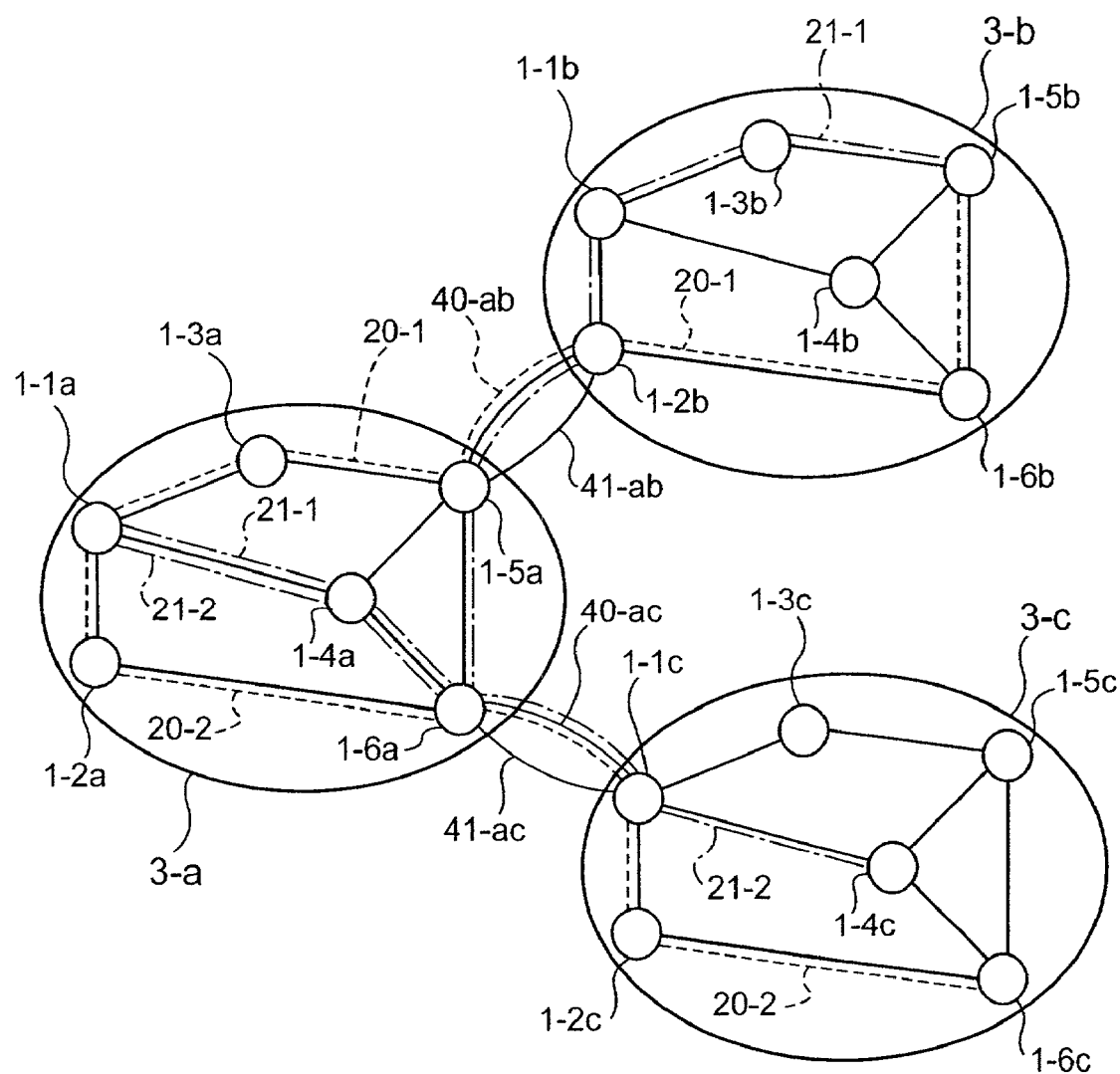
FIG. 22 shows a configuration of a network according to an eighth embodiment of the invention.
Figure 23:
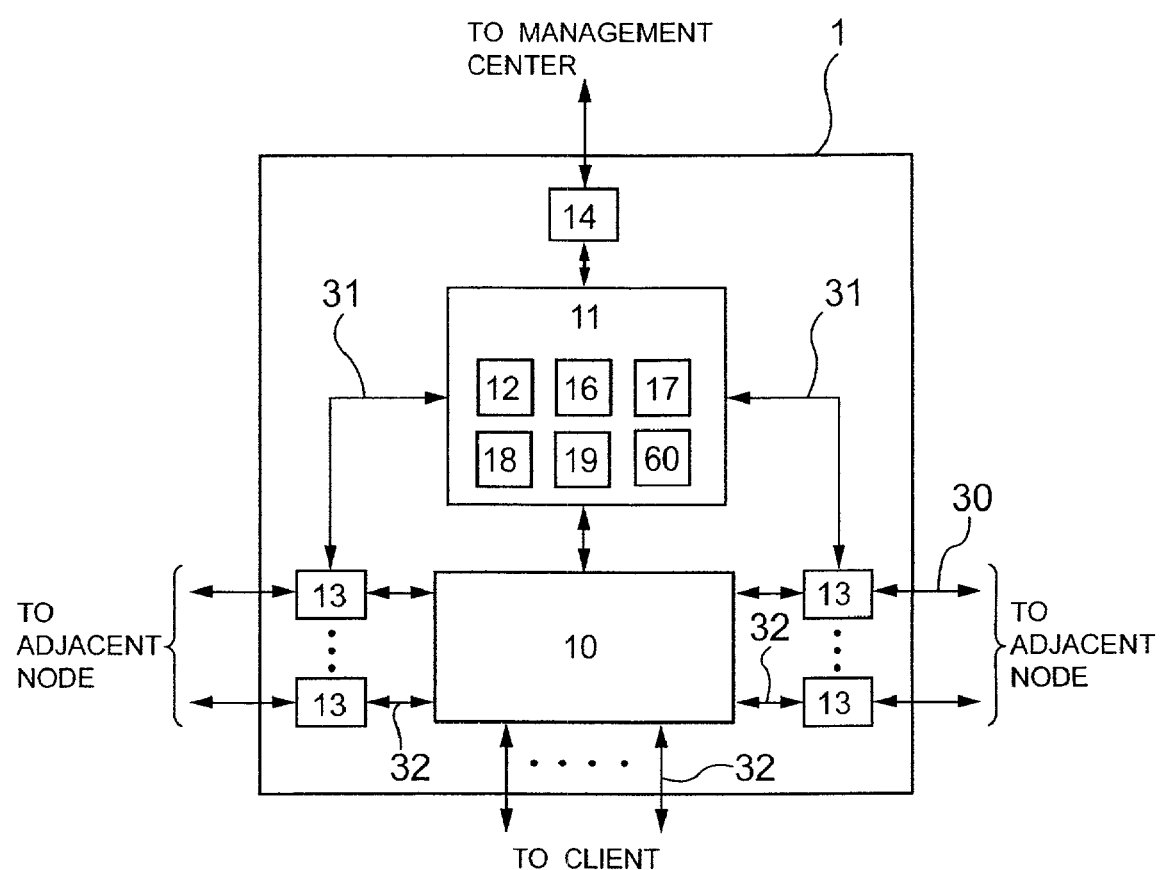
FIG. 23 shows a configuration of a node 1.
Figure 24:
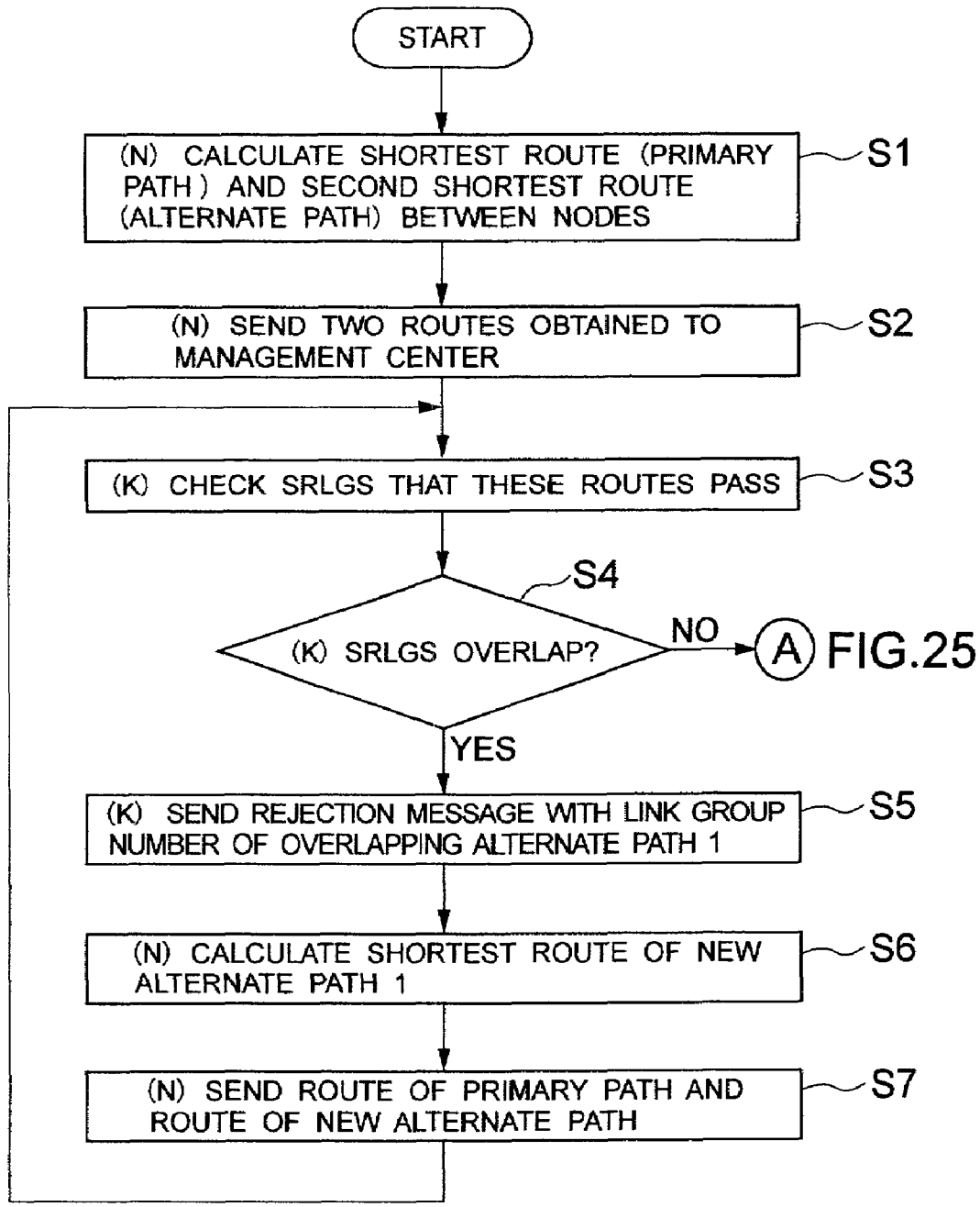
FIG. 24 is a flowchart showing operation of the first embodiment of the invention.
Figure 25:
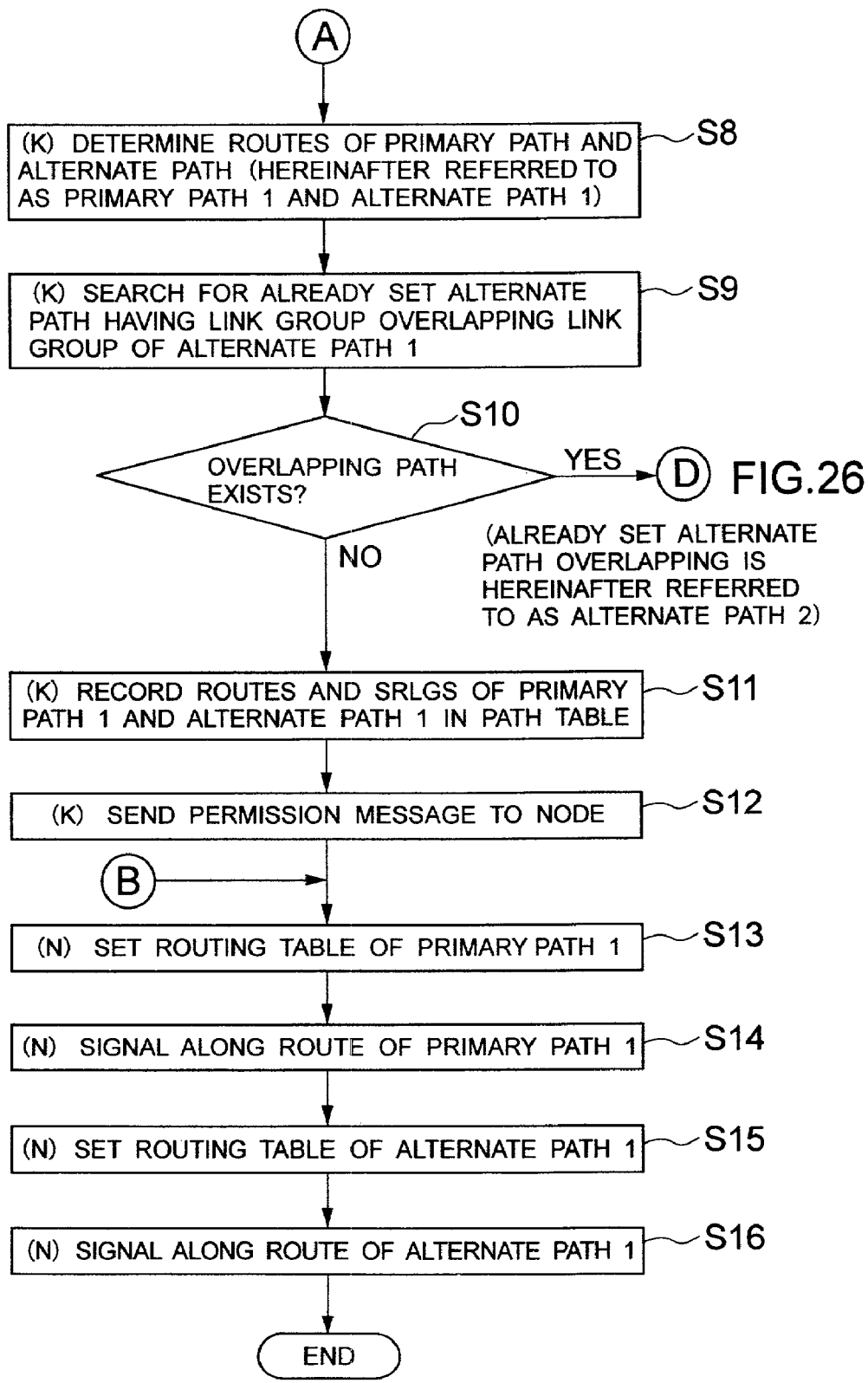
FIG. 25 is a flowchart showing operation of the first embodiment of the invention.

Next, an eighth embodiment will be described. In the eighth embodiment, a network consists of a plurality of subnetworks as in the seventh embodiment, and there is no management center 2. A configuration of a network is shown in FIG. 22. The configuration of the network is completely the same as that in the seventh embodiment except for absence of the management center 2. A configuration of a node 1 is shown in FIG. 23. In this embodiment, the node 1 has an external routing table 60 as in the seventh embodiment. Other than that, the configuration of the node 1 is completely the same as that in the third embodiment, and includes an SRLG table 16 and a path table 17.

Thus, receiving/transmission of messages between the subnetworks are the same as in the flowcharts of the seventh embodiment, and operation of the node 1 is the same as in the flowcharts of the third embodiment. Therefore, description of the operation using the flowcharts will be omitted in the eighth embodiment.

First, setting a primary path 20-1 and alternate path 21-1 whose source is a node 1-1*a* in a subnetwork 3-*a* and whose destination is a node 1-5*b* in a subnetwork 3-*b* will be considered.

A node control unit 11 of the node 1-1*a* first refers to the external routing table 60 to find that a route may pass a node 1-5*a* when the path whose destination is the node in the subnetwork 3-*b* is set. The node control unit 11 of the node 1-1*a* refers to a topology table 12 and the SRLG table 16 to calculate the routes from the node 1-1*a* to node 1-5*a* of the primary path 20-1 and alternate path 21-1 in the same manner as in the second embodiment. This provides the routes (1, 3), (3, 5) of the primary path 20-1, and the routes (1, 4), (4, 6), (5, 6) of the alternate path 21-1, and these routes share no SRLG. The node 1-1*a* records the routes and passing SRLGs in the path table 17.

Then, the node 1-1*a* sets a routing table 18 for the primary path 20-1. A setting manner here is the same as in the seventh embodiment.

Next, the node 1-1*a* sends a setting request message of the primary path 20-1 that is a kind of signaling messages to the node 1-3*a* via a control channel 31. The setting request message includes information such as identification data of the message, identification data indicating that this path is the primary path, path number, source node number, destination node number, route information and SRLG information from the node 1-1*a* to node 1-5*a*, and upstream port number of the downstream port. For the SRLG information from the node 1-1*a* to the node 1-5*a*, all the numbers of the SRLGs are added to which link groups that this path passes in the subnetwork 3-*a* belong. Other than that, the setting request message is the same as that in the seventh embodiment.

The node 1-3*a* having received the setting request message sets the routing table 18 as in the seventh embodiment, rewrites the upstream port number of the downstream node in the setting request message, and sends the setting request message to the node 1-5*a*. The node 1-3*a* writes the route information and SRLG information of the primary path 20-1 indicated by the setting request message in its own path table 17.

The node 1-5*a* having received the setting request message sets the routing table 18 as in the seventh embodiment, rewrites the upstream port number of the downstream node in the setting request message, and sends the setting request message to the node 1-2*b*. The node 1-5*a* writes the route information and SRLG information of the primary path 20-1 indicated by the setting request message in its own path table 17.

After setting the primary path 20-1, the node 1-1*a* sets the routing table 18 for the alternate path 21-1. At this time, the node 1-1*a* refers to the path table 17 and searches for another alternate path passing the link group (1, 4) like the alternate path 21-1, but there is no such alternate path. Thus, the node 1-1*a* selects the port 10 having the smallest port number from unused ports connected to the link group (1, 4) as the downstream port, and writes it in the routing table 18.

Subsequently, the node 1-1*a* sends the setting request message of the alternate path 21-1 to the node 1-4*a* via the control channel 31. The setting request message includes information such as identification data of the message, identification data indicating that this path is the alternate path, path number, source node number, destination node number, route information and SRLG information from the node 1-1*a* to node 1-5*a*, and upstream port number of the downstream port.

The node 1-4*a* having received the message refers to the path table 17 to search for another alternate path passing the link group (4, 6) like the alternate path 21-1, but there is no such alternate path. Thus, the node 1-4*a* selects the port having the smallest port number from unused ports connected to the link groups (4, 6) as the downstream port, and writes it in its own routing table 18. The node 1-4*a* rewrites the upstream port of the downstream node of the setting request message, and transfers it to the node 1-6*a*. Further, the node 1-4*a* writes the route information and SRLG information of the alternate path 21-1 indicated by the setting request message in its own path table 17.

The node 1-6*a* having received the setting request message refers to the path table 17 to search for another alternate path passing the link group (5, 6) like the alternate path 21-1, but there is no such alternate path. Thus, the node 1-6*a* selects the port having the smallest port number from unused ports connected to the link group (5, 6) as the downstream port, and writes it in its own routing table 18. The node 1-6*a* rewrites the upstream port of the downstream node of the setting request message, and transfers it to the node 1-5*a*. Further, the node 1-6*a* writes the route information and SRLG information of the alternate path 21-1 indicated by the setting request message in its own path table 17.

The node 1-5*a* having received the setting request message knows that the node 1-5*a* itself is the boundary node, and thus allocates the same port as allocated to the downstream port of the alternate path 20-1 to the downstream port of the alternate path 21-1, and sets the routing table 18. The node 1-5*a* rewrites the upstream port number of the downstream node of the setting request message, and transfers it to the node 1-2*b*. Further, the node 1-5*a* writes the route information and SRLG information of the alternate path 21-1 indicated by the setting request message in its own path table 17.

In this way, setting of the routing table 18 for the primary path 20-1 and alternate path 21-1 in the subnetwork 3-*a* is completed.

On the other hand, the topology table 12 in the subnetwork 3-*b* stores topology information in the subnetwork 3-*b*, the contents of FIG. 4, and information that the node 1-2*b* is connected to the node 5*a* of the subnetwork 3-*a*. The SRLG table 16 in the subnetwork 3-*b* holds SRLG information in the subnetwork 3-*b*, that is, the same contents as FIG. 5. In the path table 17, routes and SRLGs of the path in the subnetwork 3-*b* are recorded.

In the subnetwork 3-*b*, the node 1-2*b* first receives the setting request message of the primary path 20-1 from the node 1-5*a*. This message indicates that the destination node of this path is the node 1-5*b* in the same subnetwork, but does not indicate the route thereto. Thus, the node 1-2*b* refers to the topology table 12 and SRLG table 16 to calculate the routes from the node 1-2*b* to node 1-5*b* of the primary path 20-1 and alternate path 21-1. This provides the routes (2, 6), (5, 6) of the primary path 20-1, and the routes (1, 2), (1, 3), (3, 5) of the alternate path 21-1, and these routes share no SRLG. The node 1-2*b* records the route and passing SRLG in the path table 17.

Then, the node 1-2*b* sets the routing table 18 for the primary path 20-1. A setting manner here is the same as in the seventh embodiment.

Next, the node 1-2*b* rewrites the received route information and SRLG information of the setting request message of the primary path 20-1 into the route information and SRLG information in the subnetwork 3-*b*, and also rewrites the upstream port number of the downstream node to transmit it to the node 1-6*b*.

The node 1-6*b* having received the setting request message sets the routing table 18 as in the seventh embodiment, rewrites the upstream port number of the downstream node in the setting request message, and send the setting request message to the node 1-5*b*. The node 1-6*b* writes the route information and SRLG information of the primary path 20-1 indicated by the setting request message in its own path table 17.

The node 1-5*b* having received the setting request message sets the routing table 18 as in the seventh embodiment, changes the switch 10 in accordance with the contents of the routing table 18, generates the setting response message, and send it to the node 1-6*b*. The setting response message is transferred in a direction opposite the path on the route of the primary path 20-1 to the node 1-1*a* that is the source node. Each node on the routes receives the setting response message to change its own switch 10 in accordance with the contents of the routing table 18. In this way, setting of the primary path 20-1 is completed.

Then, the node 1-2*b* sets the routing table 18 for the alternate path 21-1. First, the node 1-2*b* refers to the path table 17 and searches for another alternate path passing the link group (1, 2) like the alternate path 21-1, but there is no such alternate path. Thus, the node 1-2*b* selects the port having the smallest port number from unused ports connected to the link groups (1, 2) as the downstream port, and writes it in its own routing table 18. The node 1-2*b* rewrites the upstream port of the downstream node of the setting request message, and transfers it to the node 1-1*b*. Further, the node 1-2*b* writes the route information of the alternate path 21-1 and SRLG information indicated by the setting request message in its own path table 17.

The node 1-1*b* having received the setting request message refers to the path table 17 to search for another alternate path passing the link group (1, 3) like the alternate path 21-1, but there is no such alternate path. Thus, the node 1-1*b* selects the port having the smallest port number from unused ports connected to the link groups (1, 3) as the downstream port, and writes it in its own routing table 18. The node 1-1*b* rewrites the upstream port of the downstream node of the setting request message, and transfers it to the node 1-3*b*. Further, the node 1-1*b* writes the route information and SRLG information of the alternate path 21-1 indicated by the setting request message in its own path table 17.

The node 1-3*b* having received the setting request message refers to the path table 17 to search for another alternate path passing a link group (3, 5) like the alternate path 21-1, but there is no such alternate path. Thus, the node 1-3*b* selects the port having the smallest port number from unused ports connected to the link groups (3, 5) as the downstream port, and writes it in its own routing table 18. The node 1-3*b* rewrites the upstream port of the downstream node of the setting request message, and transfers it to the node 1-5*b*. Further, the node 1-3*b* writes the route information and SRLG information of the alternate path 21-1 indicated by the setting request message in its own path table 17.

The node 1-5*b* having received the setting request message is the destination node of the alternate path 21-1, and thus allocates the same port as allocated to the downstream port of the primary path 20-1 to the downstream port of the alternate path 21-1, and sets the routing table 18. Then, the node 1-5*b* generates the setting response message, and send it to the node 1-3*b*. The setting response message is transferred in a direction opposite the path on the route of the alternate path 21-1 to the node 1-1*a* that is the source node. This setting response message is for the alternate path, and thus each node on the route does not change the switch 10. In this way, setting of the alternate path 21-1 is completed.

Next, setting a primary path 20-2 and alternate path 21-2 whose source is the node 1-1*a* in subnetwork 3-*a* and whose destination is a node 1-6*c* in a subnetwork 3-*c* will be considered.

The node control unit 11 of the node 1-1*a* first refers to the external routing table 60 to find that the route may pass the node 1-6*a* when the path whose destination is the node in the subnetwork 3-*c* is set. The node control unit 11 of the node 1-1*a* refers to the topology table 12 and SRLG table 16 to calculate the routes from the node 1-1*a* to node 1-6*a* of the primary path 20-2 and alternate path 21-2 in the same manner as in the second embodiment. This provides the routes (1, 2), (2, 6) of the primary path 20-2, and the routes (1, 4), (4, 6) of the alternate path 21-2, and these routes share no SRLG. The node 1-1*a* records the routes and passing SRLGs in the path table 17.

Then, the node 1-1*a* sets the routing table 18 for the primary path 20-2, and generates the setting request message of the primary path 20-2. The setting request message is transferred from the node 1-1*a* to node 1-2*a*, and node 1-6*a*, and in accordance therewith, the routing table 18 is set, and the route information and SRLG information are written in the path table 17 also in the node 1-2*a* and node 1-6*a*. The node 1-6*a* that is the boundary node selects the port connected to the link group 40-*ac* as the downstream port, and transfers the setting request message to the node 1-1*c*. The above described steps are performed in completely the same manner as for the primary path 20-1 in the subnetwork 3-*a*.

Then, the node 1-1*a* sets the routing table 18 for the alternate path 21-2. First, the node 1-1*a* searches the path table 17 and checks whether there is another alternate path passing the link group (1, 4). The alternate path 21-1 applies thereto here, so that the node 1-1*a* compares the SRLGs in the subnetwork 3-*a* that the primary path 20-1 and primary path 20-2 pass. The comparison reveals that both SRLGs do not overlap, and thus the node 1-1*a* selects the same port as allocated to the alternate path 21-1, as the downstream port of the alternate path 21-2. That is, the two alternate paths share the link in the link group (1, 4). Then, the node 1-1*a* generates the setting request message of the alternate path 21-2 and sends it to the node 1-4*a*. This setting request message includes the paths information and SRLG information of the alternate path 21-2 in the subnetwork 3-*a*.

The node 1-4*a* having received the setting request message searches its own path table 17 and checks whether there is another alternate path passing the link group (4, 6). The alternate path 21-1 also applies thereto here, so that the node 1-4*a* compares the SRLGs in the subnetwork 3-*a* that the primary path 20-1 and primary path 20-2 pass. Both SRLGs do not overlap, so that the node 1-4*a* selects the same port as allocated to the alternate path 21-1, as the downstream port of the alternate path 21-2. That is, the two alternate paths share the link also in the link group (4, 6). The node 1-4*a* writes the paths information and SRLG information of the alternate path 21-2 indicated by the setting request message in its own path table 17.

The node 1-6*a* having received the setting request message is the boundary node, and thus selects the same port as allocated to the primary path 20-2, as the downstream port of the alternate path 21-2, and sets it in the routing table 18. The node 1-6*a* writes the paths information and SRLG information of the alternate path 21-2 indicated by the setting request message in its own path table 17. Further, the node 1-6*a* rewrites the upstream port of the downstream node in the setting request message, and transfers it to the node 1-1c.

In this way, setting of the routing table 18 for the primary path 20-2 and alternate path 21-2 in the subnetwork 3-a is completed.

On the other hand, in the subnetwork 3-c, the node 1-1c receives the setting request message of the primary path 20-2 from the node 1-6a. This message indicates that the destination node of this path is the node 1-6c in the same subnetwork, but does not indicate the route thereto. Thus, the node 1-1c refers to the topology table 12 and SRLG table 16 to calculate the routes from the node 1-1c to node 1-6c of the primary path 20-2 and alternate path 21-2. This provides the routes (1, 2), (2, 6) of the primary path 20-2, and the routes (1, 4), (4, 6) of the alternate path 21-2, and these routes share no SRLG. The node 1-1c records the routes and passing SRLGs in the path table 17.

Then, the node 1-1c sets the routing table 18 for the primary path 20-2, and generates the setting request message. The setting request message is transferred from the node 1-1c to the node 1-2c and node 1-6c, and in accordance therewith, the routing table 18 is set, and the route information and SRLG information are written in the path table 17 also in the node 1-2c and node 1-6c. The node 1-6c is the destination node, and when setting the routing table 18, the node 1-6c changes the switch 10 in accordance therewith to generate the setting response message. The setting response message is transferred in a direction opposite the path on the route of the primary path 20-2 to the node 1-1a that is the source node. Each node on the route receives the setting response message to change its own switch 10 in accordance with the contents of the routing table 18. The above described steps are performed in completely the same manner as for the primary path 20-1 in the subnetwork 3-b. Therefore, setting of the primary path 20-2 is completed.

Then, the node 1-1c sets the routing table 18 for the alternate path 21-2. First, the node 1-1c refers to the path table 17 and searches for another alternate path passing a link group (1, 4) like the alternate path 21-2, but there is no such alternate path. Thus, the node 1-1c selects the port having the smallest port number from unused ports connected to the link group (1, 4) as the downstream port, and writes it in its own routing table 18. The node 1-1c rewrites the upstream port of the downstream node of the setting request message, and transfers it to the node 1-4c. Further, the node 1-1c writes the route information and SRLG information of the alternate path 21-2 indicated by the setting request message in its own path table 17.

The node 1-4c having received the setting request message refers to the path table 17 to search for another alternate path passing the link group (4, 6) like the alternate path 21-2, but there is no such alternate path. Thus, the node 1-4c selects the port having the smallest port number from unused ports connected to the link group (4, 6) as the downstream port, and writes it in its own routing table 18. The node 1-4c rewrites the upstream port of the downstream node of the setting request message, and transfers it to the node 1-6c. Further, the node 1-4c writes the route information and SRLG information of the alternate path 21-2 indicated by the setting request message in its own path table 17.

The node 1-6c having received the setting request message is the destination node of the alternate path 21-2, and thus allocates the same port as allocated to the downstream port of the primary path 20-2 to the downstream port of the alternate path 21-2, and sets the routing table 18. Then, the node 1-6c generates the setting response message, and send it to the node 1-3c. The setting response message is transferred in a direction opposite the path on the route of the alternate path 21-2 to the node 1-1a that is the source node. This setting response message is for the alternate path, and thus each node on the route does not change the switch 10. In this way, setting of the alternate path 21-2 is completed.

According to this embodiment, two pairs of path, that is the primary path 20-1 and alternate path 21-1, and the primary path 20-2 and alternate path 21-2 can be set so as not to share the SRLG in each subnetwork 3. Thus, even if failure occurs in the link or node on the primary path 20-1 or primary path 20-2 in each subnetwork 3, the failure can be recovered by switching to the alternate path. At the boundary of each subnetwork 3, failure recovery is also performed by APS. Further, in the subnetwork 3-a, the alternate path 21-1 and alternate path 21-2 shares the link on the link groups (1, 4), (4, 6), thereby allowing savings in alternate sources.

In this embodiment, the above described advantages are obtained by decentralized control without centralized controlling means.

The present invention can be applied to the embodiments described below.

1. In the above described embodiments, the two-way link is used, but a one-way way link may be used.

2. It is described that there are a plurality of links as a link group, but not limited to the plurality of links, there may be a single link.

3. In the above described embodiments, a path setting method in consideration of SRLG as a risk sharing group is described, but the risk sharing group is not limited to the SRLG. For example, a path setting method in consideration of a risk sharing group such as "a group of nodes sharing a resource" may be possible.

4. In the above described embodiment, a method for setting the primary path and alternate path between two nodes is described, but differentiation between the primary path and alternate path is not always necessary. For example, both two paths may be primary paths and used for load decentralization (applicable to the fifth embodiment).

5. In the above described embodiments, it is described that the source nodes of the plurality of primary and alternate paths that share the alternate resource (link) are the same, but not limited to this, the paths may be set in similar steps when, for example, a source node of a first pair of primary and alternate paths are a node 1-1, and a source node of a second pair of primary and alternate paths are a node 1-2.

6. In the above described embodiments, there are two pairs of primary and alternate paths that share the alternate resource (link), but not limited to this, there may be three or more pairs. Setting steps in that case are the same as those of the first pairs of paths and the second pairs of paths (though the results are different due to the different conditions). For example, repeating the steps for five pairs, five pairs of primary and alternate paths may share the alternate resource.

As described above, in the seventh and eight embodiments, signaling of the setting request message is performed from the source node via the midstream nodes to the destination node, and after the routing table is set in the destination node, the setting response message is transferred from the destination node to the source node on the same route in the opposite direction. Each node on the route receives the setting response message, changes its own switch in accordance with the contents of the routing table, and in this way, setting of the primary and alternate paths is completed (for the seventh embodiment, see page 46, lines 1 to 21, and page 47, lines 5 to 14, and for the eighth embodiment, see page 58, lines 17 to 27, page 60, lines 10 to 22, page 63, line 18 to page 64, line 7, and page 65, lines 5 to 17).

In the first to sixth embodiments, described steps are signaling of the setting request message from the source node via the midstream nodes to the destination node, and setting of the routing table in the destination node, for convenience of explanation. However, actually, after the routing table is set in the destination node, the setting response message is transferred from the destination node to the source node on the same route in the opposite direction as in the seventh and eighth embodiments.

Next, a ninth embodiment will be described. The ninth embodiment relates to a recording medium having a path setting program recorded thereon. The path setting program is a program to perform steps shown in the flowcharts of FIGS. 24 to 38 in a computer. Each step of the flowchart with indication of (N) at its front is a node control program, and each step with indication of (K) is a management center control program. These programs are recorded in the recording medium.

Figure 39:
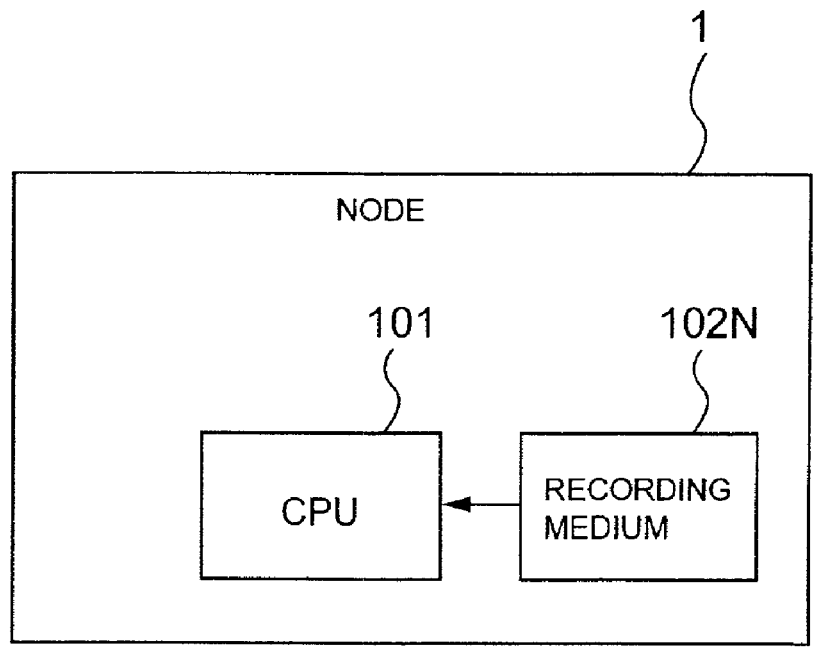
FIG. 39 shows a configuration of a node controlled by a path setting program.
Figure 40:
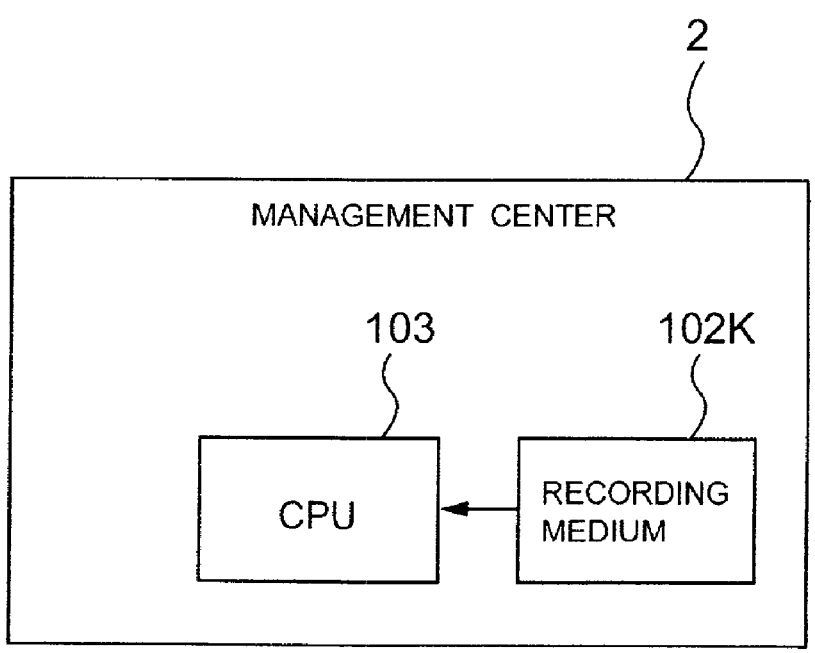
FIG. 40 shows a configuration of a management center controlled by a path setting program.

Then, a configuration of a unit controlled by the path setting program will be described. FIG. 39 shows a configuration of a node controlled by the path setting program, and FIG. 40 shows a configuration of a management center controlled by the path setting program.

First, a configuration of the node will be described. With reference to FIG. 39, a node 1 comprises a CPU (central processing unit) 101 in addition to a node control unit 11. The CPU 101 reads a program from a recording medium having a path setting program recorded thereon 102N, and controls the node control unit 11 in the node 1. The contents of control is described above, and the description thereof will be omitted.

Next, a configuration of the management center will be described. With reference to FIG. 40, the management center 2 comprises a CPU 103 in addition to a centralized control unit 15. The CPU 103 reads a program from a recording medium having a path setting program recorded thereon 102K, and controls the centralized control unit 15 in the management center 2. The contents of control are also described above, and the description thereof will be omitted.

The first aspect of the invention provides a communication network including a plurality of nodes constituting a network and a management center connected to each of the nodes, wherein each of the nodes has topology information of the network, and the management center has information on a risk sharing resource group, thereby allowing load of route calculation to be decentralized to the nodes and the management center. This prevents the load of the route calculation from being centralized in part of units and prevents increase in traffic between the nodes.

The second to sixth aspects of the invention achieves the same advantages as the first aspect. Further, advantages obtained from each embodiment are summarized as described below.

In the first and fourth embodiments, each of the nodes has topology information of the network, and the management center has information on the risk sharing resource group and currently set path information, so that each node no longer needs to hold the information on the risk sharing source and path information. Therefore, load on each node can be reduced.

In the first embodiment, information on whether SRLGs overlap is obtained from the management center after routes of the primary and alternate paths are calculated, so that several times of calculation is sometimes required before the primary and alternate paths having no overlapping SRLG can be obtained. However, in the fourth embodiment, a list of SRLGs not included in the route of the primary path is received from the management center before the route of the alternate path is calculated, thereby always allowing single calculation of the alternate path.

In the second embodiment, each node has topology information of the network and information on the risk sharing resource group, and the management center has currently set path information, so that each node no longer needs to hold the path information. Therefore, load on each node can be reduced.

In the third embodiment, each node has topology information of the network, information on the risk sharing resource group, and information on a currently set path passing the node itself, thereby eliminating the need for the management center, and preventing the number of nodes of the network from being limited by capacity of the management center. Failure of the management center do not cause the entire network to be down. Further, each node holds only information on the path passing the node itself as path information, so that a large memory for each node is not required. Also, each node searches for only existing alternate paths having the overlapping route in the link group between the node itself and the downstream node, thereby allowing load of searching for an existing path on each node to be reduced.

In the fifth embodiment, each node has topology information of the network, and the management center has information on the risk sharing resource group, so that each node no longer needs to hold the information on the risk sharing resource group. Therefore, load on each node can be reduced.

In the sixth embodiment, each node has topology information of the network, and the management center has currently set path information, so that each node no longer needs to hold the path information. Therefore, load on each node can be reduced.

In the seventh and eighth embodiments, the network shown in the first to sixth embodiments consists of a plurality of subnetworks, thereby allowing the primary path and alternate path closed for each subnetwork to be set. Therefore, failure recovery is performed for each subnetwork, and failure recovery time is reduced.

What is claimed is:

1. A path setting method in a communication network comprising a plurality of nodes constituting a network,
   wherein each of said nodes has topology information of said network, information on a risk sharing resource group, and information on a currently set path passing the node itself, and
   said method comprises:
   a first step in which a source node refers to said topology information of the network and said information on the risk sharing resource group to calculate routes of a first path and a second path so as not to pass the same risk sharing resource group; and
   a second step in which each node on said routes receives a signal from an upstream node, refers to said information on the risk sharing resource group and said information on the currently set path passing the node itself to detect a second path having an overlapping route in a link group between the node itself and a downstream node and compare said risk sharing resource groups of said first path.

2. A path setting method in a communication network in which a communication network as set forth in claim 1 consists of a plurality of subnetworks, wherein each of said node comprises an external routing table showing a boundary node that a route passes when a path to a destination node in another subnetwork is set, and said method comprises:

a third step in which a first path and a second path from a source node to said boundary node are set; and a fourth step in which a first path and a second path from said boundary node to a destination node in another subnetwork are set.

3. A recording medium storing a path setting program for controlling a node in a communication network comprising a plurality of nodes constituting a network, wherein each of said nodes has topology information of said network, information on a risk sharing resource group, and information on a currently set path passing the node itself, and said path setting program comprises:

a first set of instructions in which a source node refers to said topology information of the network and said information on the risk sharing resource group to calculate routes of a first path and a second path so as not to pass the same risk sharing resource group; and a second set of instructions in which each node on said routes receives a signal from an upstream node, refers to said information on the risk sharing resource group and said information on the currently set path passing the node itself to detect a second path having an overlapping route in a link group between the node itself and a downstream node and compare said risk sharing resource groups of said first path.

4. A path setting method according to claim 1, wherein in said second set of instructions, signaling message to set said second path includes the identity information of all of the risk sharing resource groups through which said first path passes.

5. A recording medium according to claim 3, wherein in said second set of instructions, signaling message to set said second path includes the identity information of all of the risk sharing resource groups through which said first path passes.

6. A plurality of nodes constituting a network, each said node comprising information including: topology information of said network, information on a risk sharing resource group, and information on a currently set path passing the node itself, and when calculating a first path and a second path having different routes, said node refers to this information, and wherein said node receives signaling message from an upstream node including the identity information of all of the risk sharing resource groups through which said first path passes to detect the second path having an overlapping route in a link group between the node itself and a downstream node and compare said risk sharing resource groups of said first path.

* * * * *